US012562451B2

(12) United States Patent
Horie et al.

(10) Patent No.: US 12,562,451 B2
(45) Date of Patent: Feb. 24, 2026

(54) ANTENNA UNIT, ANTENNA UNIT-ATTACHED WINDOW GLASS, AND MATCHING BODY

(71) Applicants: AGC Inc., Tokyo (JP); AGC GLASS EUROPE, Louvain-la-Neuve (BE); AGC FLAT GLASS NORTH AMERICA, INC., Alpharetta, GA (US); AGC Vidros do Brasil Ltda., Sao Paulo (BR)

(72) Inventors: Masaki Horie, Tokyo (JP); Ryuta Sonoda, Tokyo (JP); Yukio Takahashi, Tokyo (JP)

(73) Assignees: AGC Inc., Tokyo (JP); AGC GLASS EUROPE, Louvain-la-Neuve (BE); AGC FLAT GLASS NORTH AMERICA, INC., Alpharetta, GA (US); AGC Vidros do Brasil Ltda., Sao Paulo (BR)

( * ) Notice: Subject to any disclaimer, the term of this patent is extended or adjusted under 35 U.S.C. 154(b) by 0 days.

(21) Appl. No.: 18/751,729

(22) Filed: Jun. 24, 2024

(65) Prior Publication Data

US 2024/0347893 A1 Oct. 17, 2024

Related U.S. Application Data

(60) Division of application No. 17/019,734, filed on Sep. 14, 2020, now Pat. No. 12,051,848, which is a (Continued)

(30) Foreign Application Priority Data

Mar. 16, 2018 (JP) ................................ 2018-050042

(51) Int. Cl.
*H01Q 1/12* (2006.01)
*H01Q 1/22* (2006.01)
(Continued)

(52) U.S. Cl.
CPC ............ *H01Q 1/1271* (2013.01); *H01Q 1/22* (2013.01); *H01Q 1/32* (2013.01); *H01Q 19/22* (2013.01)

(58) Field of Classification Search
CPC .......... H01Q 1/1271; H01Q 1/22; H01Q 1/32; H01Q 19/22
See application file for complete search history.

(56) References Cited

U.S. PATENT DOCUMENTS

| | | | |
|---|---|---|---|
| 6,014,110 | A | 1/2000 | Bridges |
| 2005/0009474 | A1 | 1/2005 | Inoue |

(Continued)

FOREIGN PATENT DOCUMENTS

| | | | |
|---|---|---|---|
| CN | 105490016 | A | 4/2016 |
| DE | 196 10 783 | A1 | 9/1997 |

(Continued)

OTHER PUBLICATIONS

English translation of JP2005033475A (Year: 2005).*

*Primary Examiner* — Amal Patel
(74) *Attorney, Agent, or Firm* — Oblon, McClelland, Maier & Neustadt, L.L.P.

(57) ABSTRACT

An antenna unit used by being attached to window glass for a building includes a radiating element, a wave directing member arranged on an outdoor side with respect to the radiating element, and a conductor arranged on an indoor side with respect to the radiating element, wherein where a distance between the radiating element and the wave directing member is denoted as a, and where a relative permittivity of a medium constituted by a dielectric member between the radiating element and the wave directing member is denoted as $\varepsilon_r$, the distance a is $(2.11 \times \varepsilon_r - 1.82)$ mm or more.

4 Claims, 30 Drawing Sheets

Related U.S. Application Data continuation of application No. PCT/JP2019/010812, filed on Mar. 15, 2019.

(51) Int. Cl.

| | |
|---|---|
| ***H01Q 1/32*** | (2006.01) |
| ***H01Q 19/22*** | (2006.01) |

(56) References Cited

U.S. PATENT DOCUMENTS

| | | | | |
|---|---|---|---|---|
| 2006/0097923 | A1 | 5/2006 | Li et al. | |
| 2006/0109178 | A1 | 5/2006 | Takeuchi et al. | |
| 2007/0216589 | A1 | 9/2007 | Li et al. | |
| 2008/0129619 | A1* | 6/2008 | Lee ........................ | H01Q 21/26 343/810 |
| 2017/0207513 | A1 | 7/2017 | Miyoshi et al. | |
| 2019/0044239 | A1 | 2/2019 | Sonoda | |

FOREIGN PATENT DOCUMENTS

| | | | | |
|---|---|---|---|---|
| DE | 10 2017 200 689 | A1 | | 7/2017 |
| JP | 05-37218 | A | | 2/1993 |
| JP | 06-196915 | A | | 7/1994 |
| JP | 9-502073 | A | | 2/1997 |
| JP | 2005033475 | A | * | 2/2005 |
| JP | 2007-049225 | A | | 2/2007 |
| JP | 2008-135931 | A | | 6/2008 |
| WO | WO 88/01440 | A1 | | 2/1988 |
| WO | WO-2016/162252 | A1 | | 10/2016 |

* cited by examiner

ANTENNA UNIT, ANTENNA UNIT-ATTACHED WINDOW GLASS, AND MATCHING BODY

CROSS-REFERENCE TO RELATED APPLICATION

The present application is a divisional application of U.S. application Ser. No. 17/019,734, file Sep. 14, 2020, which is a continuation application filed under 35 U.S.C. 111 (a) claiming benefit under 35 U.S.C. 120 and 365 (c) of PCT International Application No. PCT/JP2019/010812 filed on Mar. 15, 2019, and designating the U.S., which claims priority to Japanese Patent Application No. 2018-050042 filed on Mar. 16, 2018. The entire contents of the foregoing applications are incorporated herein by reference.

BACKGROUND OF THE INVENTION

1. Field of the Invention

The present invention relates to an antenna unit, an antenna unit-attached window glass, and a matching body.

2. Description of the Related Art

Conventionally, there has been known a technique for improving the electromagnetic wave penetration performance by using, as a building finishing material, an electromagnetic wave transparent body having a three-layer structure covering an antenna (for example, see PTL 1).

CITATION LIST

Patent Literature

[PTL 1] Japanese Patent Laid-Open No. H6-196915

SUMMARY OF THE INVENTION

Technical Problem

Flat antennas such as microstrip antennas strongly radiate electromagnetic waves in the front direction. However, as illustrated in FIG. 1, when window glass 200 having a relatively high relative permittivity is present in front (forward direction) of a flat antenna 100, the electromagnetic waves are reflected at the interface of the window glass 200, which increases radiation to the back of the flat antenna 100. As a result, a FB ratio (Front-to-Back ratio) of the flat antenna 100 may decrease. It should be noted that the FB ratio represents a gain ratio of a main lobe to one of the side lobes having the highest gain within a range of ±60 degrees from the direction 180 degrees opposite to the main lobe.

Therefore, the present disclosure provides an antenna unit, an antenna unit-attached window glass, and a matching body with an improvement in an FB ratio.

Solution to Problems

According to an aspect of the present disclosure, provided is an antenna unit used by being attached to window glass for a building, including:

a radiating element;

a wave directing member arranged on an outdoor side with respect to the radiating element; and a conductor arranged on an indoor side with respect to the radiating element, wherein where a distance between the radiating element and the wave directing member is denoted as a, and where a relative permittivity of a medium constituted by a dielectric member between the radiating element and the wave directing member is denoted as $\varepsilon_r$, the distance a is $(2.11\times\varepsilon_r-1.82)$ mm or more. Also provided is an antenna unit-attached window glass including the above antenna unit.

According to another aspect of the present disclosure, provided is an antenna unit used by being attached to window glass for a building, including:

a radiating element;

a wave directing member arranged on an outdoor side with respect to the radiating element; and a conductor arranged on an indoor side with respect to the radiating element, wherein a medium is provided between the radiating element and the wave directing member, the medium includes a space, and a distance a between the radiating element and the wave directing member is 2.1 mm or more. Also provided is an antenna unit-attached window glass including the above antenna unit.

According to still another aspect of the present disclosure, provided is an antenna unit used by being attached to window glass for a building, including:

a radiating element;

a wave directing member arranged on an outdoor side with respect to the radiating element; and a conductor arranged on an indoor side with respect to the radiating element, wherein where a distance between the radiating element and the wave directing member is denoted as a, a relative permittivity of a medium between the radiating element and the wave directing member is denoted as $\varepsilon_r$, and a wavelength at an operation frequency of the radiating element is denoted as $\lambda_g$, the distance a is $(0.031\times\varepsilon_r^2-0.065\times\varepsilon_r+0.040)\times\lambda_g$ or more. Also provided is an antenna unit-attached window glass including the above antenna unit.

According to still another aspect of the present disclosure, provided is an antenna unit used by being attached to window glass for a building, including:

a radiating element arranged so that a matching member is interposed between the window glass and the radiating element; and a conductor arranged so that the radiating element is interposed between the matching member and the conductor, wherein where a relative permittivity of the window glass is denoted as $\varepsilon_r1$, a relative permittivity of the matching member is denoted as $\varepsilon_r2$, and a relative permittivity of a medium between the matching member and the radiating element is denoted as $\varepsilon_r3$, $\varepsilon_r1$ is larger than $\varepsilon_r2$, and $\varepsilon_r2$ is larger than $\varepsilon_r3$. Also provided is an antenna unit-attached window glass including the above antenna unit.

According to still another aspect of the present disclosure, provided is an antenna unit used by being attached to window glass for a building, including:

a radiating element arranged so that a matching member is interposed between the window glass and the radiating element; and a conductor arranged so that the radiating element is interposed between the matching member and the conductor, wherein where a distance between the window glass and the radiating element is denoted as e, and a relative permittivity of the matching member is denoted as $\varepsilon_r2$, e is $(-0.57\times\varepsilon_r2+30.1)$ mm or more. Also provided is an antenna unit-attached window glass including the above antenna unit.

According to still another aspect of the present disclosure, provided is an antenna unit used by being attached to window glass for a building, including:

a radiating element arranged so that a matching member is interposed between the window glass and the radiating element; and a conductor arranged so that the radiating element is interposed between the matching member and the conductor, wherein where a distance between the window glass and the radiating element is denoted as e, a relative permittivity of the matching member is denoted as $\varepsilon_r2$, and a wavelength at an operation frequency of the radiating element is denoted as $\lambda_g$, e is $(-0.002\times\varepsilon_r2^2+0.0849\times\varepsilon_r2+0.2767)\times\lambda_g$ or more. Also provided is an antenna unit-attached window glass including the above antenna unit.

According to still another aspect of the present disclosure, provided is a matching body used by being sandwiched between window glass for a building and an antenna unit, wherein where a relative permittivity of the window glass is denoted as $\varepsilon_r1$, a relative permittivity of the matching member is denoted as $\varepsilon_r2$, and a relative permittivity of a medium between the matching member and a radiating element provided in the antenna unit is denoted as $\varepsilon_r3$, $\varepsilon_r1$ is larger than $\varepsilon_r2$, and $\varepsilon_r2$ is larger than $\varepsilon_r3$.

According to still another aspect of the present disclosure, provided is a matching body used by being sandwiched between window glass for a building and an antenna unit, wherein where a distance between the window glass and a radiating element provided in the antenna unit is denoted as e, and a relative permittivity of the matching member is denoted as $\varepsilon_r2$, e is $(-0.57\times\varepsilon_r2+30.1)$ mm or more.

According to still another aspect of the present disclosure, provided is a matching body used by being sandwiched between window glass for a building and an antenna unit, wherein where a distance between the window glass and a radiating element provided in the antenna unit is denoted as e, a relative permittivity of the matching member is denoted as $\varepsilon_r2$, and a wavelength at an operation frequency of the radiating element is denoted as $\lambda_g$, e is $(-0.002\times\varepsilon_r2^2+0.0849\times\varepsilon_r2+0.2767)\times\lambda_g$ or more.

Advantageous Effects of Invention

According to the present disclosure, an FB ratio can be improved.

DETAILED DESCRIPTION OF THE PREFERRED EMBODIMENTS

Hereinafter, embodiments of the present invention will be explained with reference to drawings. In the following explanation, an X-axis direction, a Y-axis direction, and a Z-axis direction represent a direction parallel to the X axis, a direction parallel to the Y axis, and a direction parallel to the Z axis, respectively. The X-axis direction, the Y-axis direction, and the Z-axis direction are orthogonal to each other. The XY plane is a virtual plane parallel to the X axis direction and the Y axis direction. The YZ plane is a virtual plane parallel to the Y axis direction and the Z axis direction. The ZX plane is a virtual plane parallel to the Z axis direction and the X axis direction.

Figure 1:
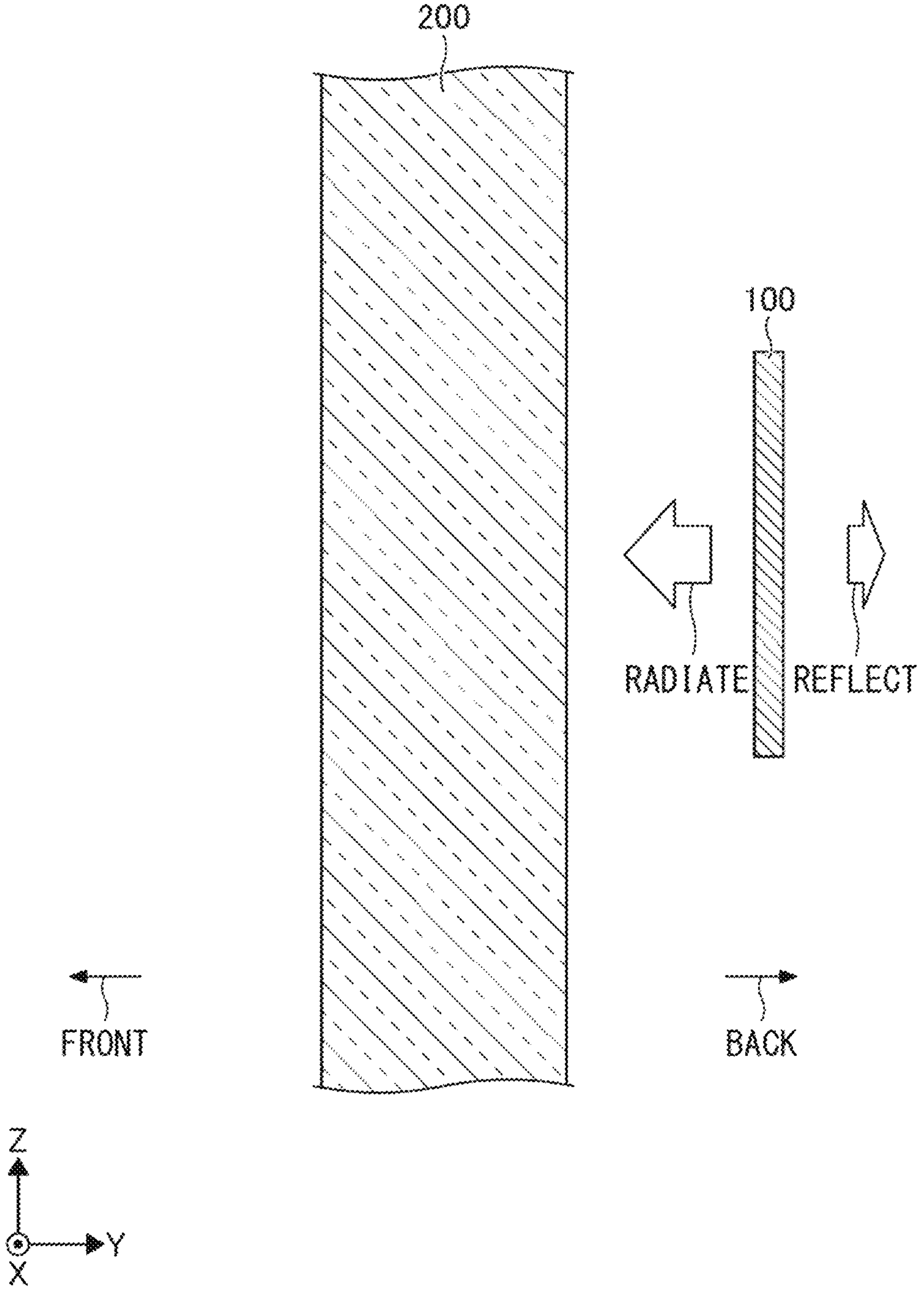
FIG. 1 is a drawing schematically illustrating a case where window glass is present in the forward direction of a flat antenna.
Figure 2:
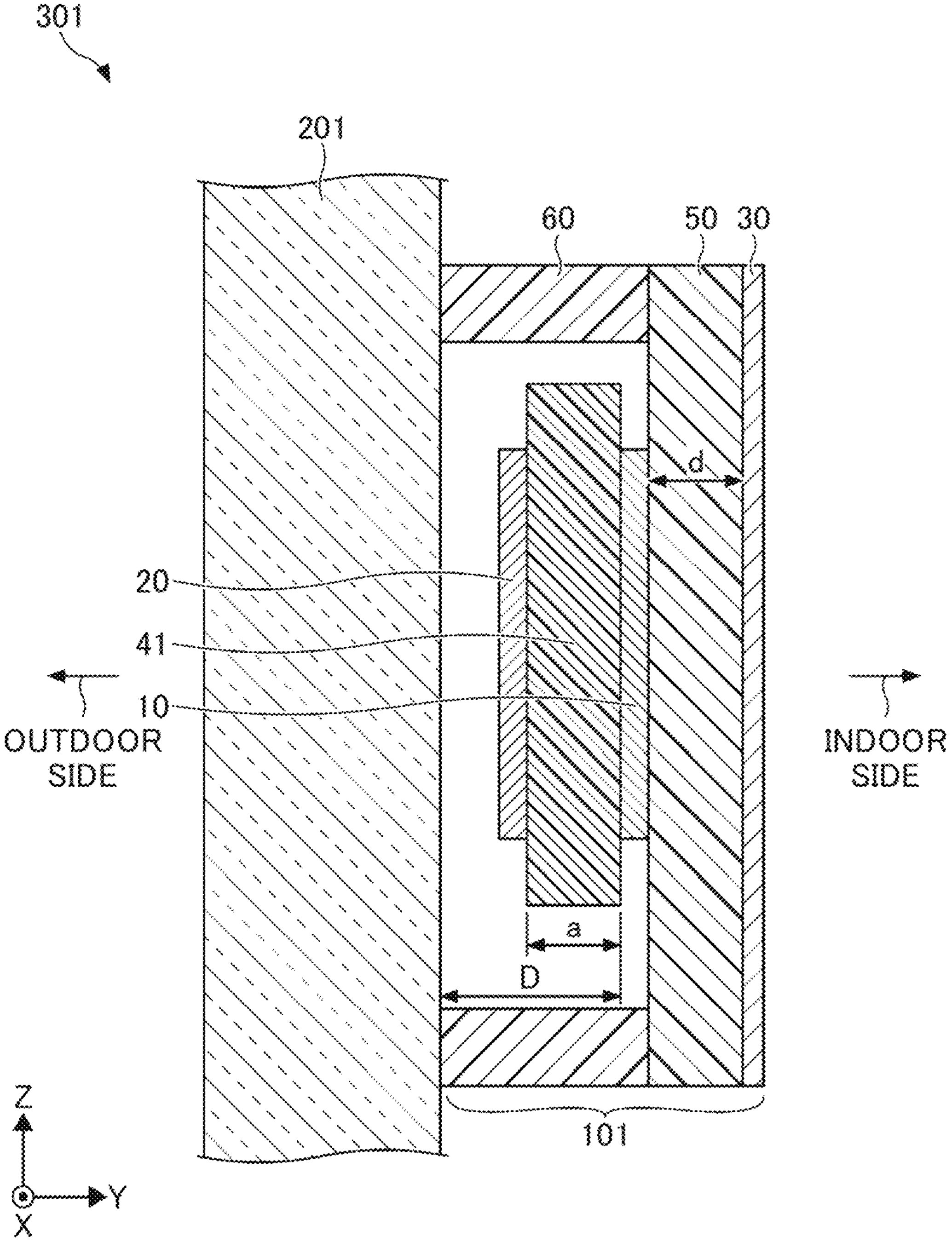
FIG. 2 is a cross sectional view schematically illustrating an example of a laminated structure of antenna unit-attached window glass according to a first embodiment.

FIG. 2 is a cross sectional view schematically illustrating an example of a laminated structure of an antenna unit-attached window glass according to the first embodiment. An antenna unit-attached window glass 301 includes an antenna unit 101 and a window glass 201. The antenna unit 101 is attached to an indoor-side surface of a window glass 201 for a building.

The antenna unit 101 is a device used by being attached to the indoor side of the window glass 201 for the building. For example, the antenna unit 101 is designed to support wireless communication standards such as 5th generation mobile communication systems (commonly referred to as 5G), Bluetooth (registered trademark), and wireless LAN (Local Area Network) standards such as IEEE 802.11ac. The antenna unit 101 may be configured to be compatible with standards other than the above.

The antenna unit 101 includes at least a radiating element 10, a wave directing member 20, and a conductor 30. The radiating element 10 is an antenna conductor formed to be able to transmit and receive electromagnetic waves in a desired frequency band. Examples of desired frequency bands include an SHF (Super High Frequency) band with a frequency of 3 to 30 GHz and an EHF (Extremely High Frequency) band with a frequency of 30 to 300 GHZ. The radiating element 10 functions as a radiating device (radiator).

The wave directing member 20 is provided so as to be located on the outdoor side with respect to the radiating element 10, and in the illustrated configuration, the wave directing member 20 is provided to be located in a specific direction (more specifically, on the negative side in the Y-axis direction) with respect to the radiating element 10.

The wave directing member 20 according to the present embodiment is provided to be located between the window glass 201 and the radiating element 10. In addition, just like a wave directing member of a Yagi-Uda antenna, the wave directing member 20 has the function of guiding electromagnetic waves radiated from the radiating element 10 in a specific direction (the negative side in the Y-axis direction in the illustrated case). That is, with the wave directing member 20, the directivity of the antenna unit 101 can be set in any desired direction.

The conductor 30 is provided on the indoor side with respect to the radiating element 10, and in the illustrated configuration, the conductor 30 is provided on the positive side in the Y-axis direction with respect to the radiating element 10.

As described above, the antenna unit 101 has the wave directing member 20 arranged between the window glass 201 and the radiating element 10, so that the electromagnetic waves radiated from the radiating element 10 toward the window glass 201 can be narrowed by the wave directing member 20, the reflections of the electromagnetic waves at the interface of the window glass 201 are reduced, and the FB ratio is improved.

Where a distance between the radiating element 10 and the wave directing member 20 is denoted as a, and a relative permittivity of a medium constituted by a dielectric member 41 between the radiating element 10 and the wave directing member 20 is denoted as $\varepsilon_r$, the distance a is preferably equal to or more than $(2.11\times\varepsilon_r-1.82)$ mm in order to improve the FB ratio. The inventors of the present application have found that the FB ratio becomes 0 dB or more by setting the distance a as described above. The FB ratio being 0 dB or more means that the gain of the main lobe is equal to or more than the gain of one of the side lobes having the highest gain within a range of +60 degrees from the direction 180 degrees opposite to the main lobe, and the maximum radiating direction in the directivity of the radiating element 10 faces the outdoor side. The upper limit of the distance a is not particularly limited, but the distance a may be 100 mm or less, may be 50 mm or less, may be 30 mm or less, may be 20 mm or less, or may be 10 mm or less. Where the wavelength of the operation frequency of the radiating element 10 is denoted as $\lambda_g$, the distance a may be $100\times\lambda_g/85.7$ or less, may be $50\times\lambda_g/85.7$ or less, may be $30\times\lambda_g/85.7$ or less, may be $20\times\lambda_g/85.7$ or less, or may be $10\times\lambda_g/85.7$ or less.

Where the operation frequency of the radiating element 10 is 0.7 to 30 GHz (preferably 1.5 to 6.0 GHZ, more preferably 2.5 to 4.5 GHZ, still more preferably 3.3 to 3.7 GHz, and particularly preferably 3.5 GHZ), the distance a is particularly preferably $(2.11\times\varepsilon_r-1.82)$ mm or more in order to improve the FB ratio.

A value obtained by dividing the size of area of the wave directing member 20 by the size of area of the window glass 201 is preferably 0.00001 to 0.001. When the value obtained by dividing the size of area of the wave directing member 20 by the size of area of the window glass 201 is 0.00001 or more, the FB ratio is improved. The value obtained by dividing the size of area of the wave directing member 20 by the size of area of the window glass 201 is more preferably 0.00005 or more, still more preferably 0.0001 or more, and particularly preferably 0.0005 or more. When the value obtained by dividing the size of area of the wave directing member 20 by the size of area of the window glass 201 is 0.001 or less, the wave directing member 20 is inconspicuous and good in design in terms of appearance. The value obtained by dividing the size of area of the wave directing member 20 by the size of area of the window glass 201 is more preferably 0.0008 or less, and still more preferably 0.0007 or less.

Subsequently, a configuration of the wave directing member 20 will be explained in more detail.

The antenna unit 101 includes a radiating element 10, a wave directing member 20, a conductor 30, a dielectric member 41, a dielectric member 50, and a support portion 60. For example, the radiating element 10 is a conductor formed in a flat shape. The radiating element 10 is made of a conductive material such as Au (gold), Ag (silver), Cu (copper), Al (aluminum), Cr (chromium), Pd (lead), Zn (zinc), Ni (nickel), or Pt (platinum). The conductive material may be an alloy such as, for example, an alloy of copper and zinc (brass), an alloy of silver and copper, an alloy of silver and aluminum, and the like. The radiating element 10 may be a thin film. The shape of the radiating element 10 may be a rectangular or circular shape, but is not limited to these shapes. For example, at least one or more radiating elements 10 are provided to be located between the wave directing member 20 and the conductor 30, and in the illustrated configuration, the radiating element 10 may be formed on a surface of the dielectric member 50 at the side of the wave directing member 20, the dielectric member 50 being located between the wave directing member 20 and the conductor 30. For example, the radiating element 10 is fed at a feeding point with the conductor 30 being the ground reference. For example, a patch element, a dipole element, and the like can be used as the radiating element 10.

For example, the wave directing member 20 is a conductor formed in a flat shape. The wave directing member 20 is made of a conductive material such as Au (gold), $\lambda_g$ (silver), Cu (copper), Al (aluminum), Cr (chromium), Pd (lead), Zn (zinc), Ni (nickel), or Pt (platinum). The conductive material may be an alloy such as, for example, an alloy of copper and zinc (brass), an alloy of silver and copper, an alloy of silver and aluminum, and the like. For example, the wave directing member 20 may be formed by attaching a conductive material to a glass substrate or a resin substrate. The radiating element 10 may be a thin film.

The conductor used for the radiating element 10 and the wave directing member 20 may be formed in a mesh form to have optical transparency. In this case, "mesh" means a state in which through holes in a form of mesh are formed in the flat surface of the conductor.

When the conductor is formed in a mesh form, the openings of the mesh may be in a rectangular or rhomboid shape. When the openings of the mesh are formed in a rectangular shape, the openings of the mesh are preferably in a square shape. When the openings of the mesh are in a square shape, the design is good. Alternatively, the openings of the mesh may be in self assembly-based random shapes. Such random shapes can prevent moiré. The line width of the mesh is preferably 5 to 30 μm, and more preferably 6 to 15 μm. The line spacing of the mesh is preferably 50 to 500 μm, and more preferably 100 to 300 μm.

Where the wavelength of the operation frequency of the radiating element 10 is denoted as A, the line spacing of the mesh is preferably 0.5λ or less, more preferably 0.1λ or less, and still more preferably 0.01λ or less. When the line spacing of the mesh is 0.5λ or less, the performance of the antenna is high. Also, the line spacing of the mesh may be 0.001λ or more.

For example, the conductor 30 is a conductor plane formed in a flat shape. The shape of the radiating element 10 may be a rectangular or circular shape, but is not limited to these shapes. For example, at least one or more conductors 30 are provided on the opposite side of the radiating element 10 from the wave directing member 20, and in the illustrated configuration, the conductor 30 is formed on a surface of the dielectric member 50 opposite from the wave directing member 20.

For example, the dielectric member 50 is a dielectric substrate having a dielectric as its main component. The dielectric member 50 may be a member (for example, a film) different from a substrate. Specific examples of the dielectric member 50 include a glass substrate, acrylic, polycarbonate, PVB (polyvinyl butyral), COP (cycloolefin polymer), PET (polyethylene terephthalate), polyimide, ceramic, sapphire, and the like. When the dielectric member 50 is made of a glass substrate, examples of glass substrate materials include alkali-free glass, quartz glass, soda lime glass, borosilicate glass, alkali borosilicate glass, and aluminosilicate glass.

The antenna unit 101 according to the present embodiment has a configuration in which the dielectric member 50 is sandwiched between the radiating element 10 and the conductor 30 so as to form a microstrip antenna, i.e., a type of flat antenna. Alternatively, a plurality of radiating elements 10 may be arranged on the surface of the dielectric member 50 at the side of the wave directing member 20 so as to form an array antenna.

The dielectric member 41 is a medium between the radiating element 10 and the wave directing member 20. In the present embodiment, the wave directing member 20 is provided on the dielectric member 41, and specifically, the wave directing member 20 is provided on a surface of the dielectric member 41 at the outdoor side. The dielectric member 41 is supported by the dielectric member 50 so that the indoor-side surface of the dielectric member 41 is in contact with the radiating element 10. For example, the dielectric member 41 is a dielectric base material having a dielectric as its main component with a relative permittivity of larger than 1 and equal to or less than 15 (preferably 7 or less, more preferably 5 or less, and particularly preferably 2.2 or less). Examples of the dielectric member 41 include fluororesin, COC (cycloolefin copolymer), COP (cycloolefin polymer), PET (polyethylene terephthalate), polyimide, ceramic, sapphire, and a glass substrate. When the dielectric member 41 is formed of a glass substrate, examples of materials of the glass substrate include alkali-free glass, quartz glass, soda lime glass, borosilicate glass, alkali borosilicate glass, and aluminosilicate glass. For example, the relative permittivity is measured by the cavity resonator.

The support portion 60 is a portion that supports the antenna unit 101 on the window glass 201. In the present embodiment, the support portion 60 supports the antenna unit 101 so as to form a space between the window glass 201 and the wave directing member 20. The support portion 60 may be a spacer that secures a space between the window glass 201 and the dielectric member 50 or a housing of the antenna unit 101. The support portion 60 is formed by a dielectric base material. Examples of materials of the support portion 60 include known resins such as silicone resin, polysulfide resin, and acrylic resin. Alternatively, a metal such as aluminum may be used.

Where the wavelength at the resonance frequency of the radiating element 10 is denoted as λ, the distance D between the window glass 201 and the radiating element 10 is preferably 0 to 3λ. When the distance D between the window glass 201 and the radiating element 10 is 0 to 3 Δ, the reflection of the electromagnetic wave at the glass interface can be alleviated. The distance D between the window glass 201 and the radiating element 10 is more preferably 0.1λ or more, and still more preferably 0.2λ or more. The distance D between the window glass 201 and the radiating element 10 is more preferably 2λ or less, still more preferably λ or less, and particularly preferably 0.6λ or less.

A value obtained by dividing the size of area of the wave directing member 20 by the size of area of the dielectric member 50 is preferably 0.0001 to 0.01. When the value obtained by dividing the size of area of the wave directing member 20 by the size of area of the dielectric member 50 is 0.0001 or more, the FB ratio improves. The value obtained by dividing the size of area of the wave directing member 20 by the size of area of the dielectric member 50 is more preferably 0.0005 or more, still more preferably 0.001 or more, and particularly preferably 0.0013 or more. When the value obtained by dividing the size of area of the wave directing member 20 by the size of area of the dielectric member 50 is 0.01 or less, the wave directing member 20 is inconspicuous and good in design in terms of appearance. The value obtained by dividing the size of area of the wave directing member 20 by the size of area of the dielectric member 50 is more preferably 0.005 or less, and still more preferably 0.002 or less.

It should be noted that the wave directing member 20 may be provided to be in contact with the indoor-side surface of the window glass 201. In this case, the dielectric member 41 may be provided, or may not be provided, and the relative permittivity of the medium between the radiating element 10 and the wave directing member 20 is preferably less than the relative permittivity of the window glass 201. The relative permittivity of the window glass 201 may be 10 or less, may be 9 or less, may be 7 or less, or may be 5 or less.

The window glass 201 is not limited to single-layer glass (a single glass plate), but may be insulating glazing or laminated glass.

Figure 3:
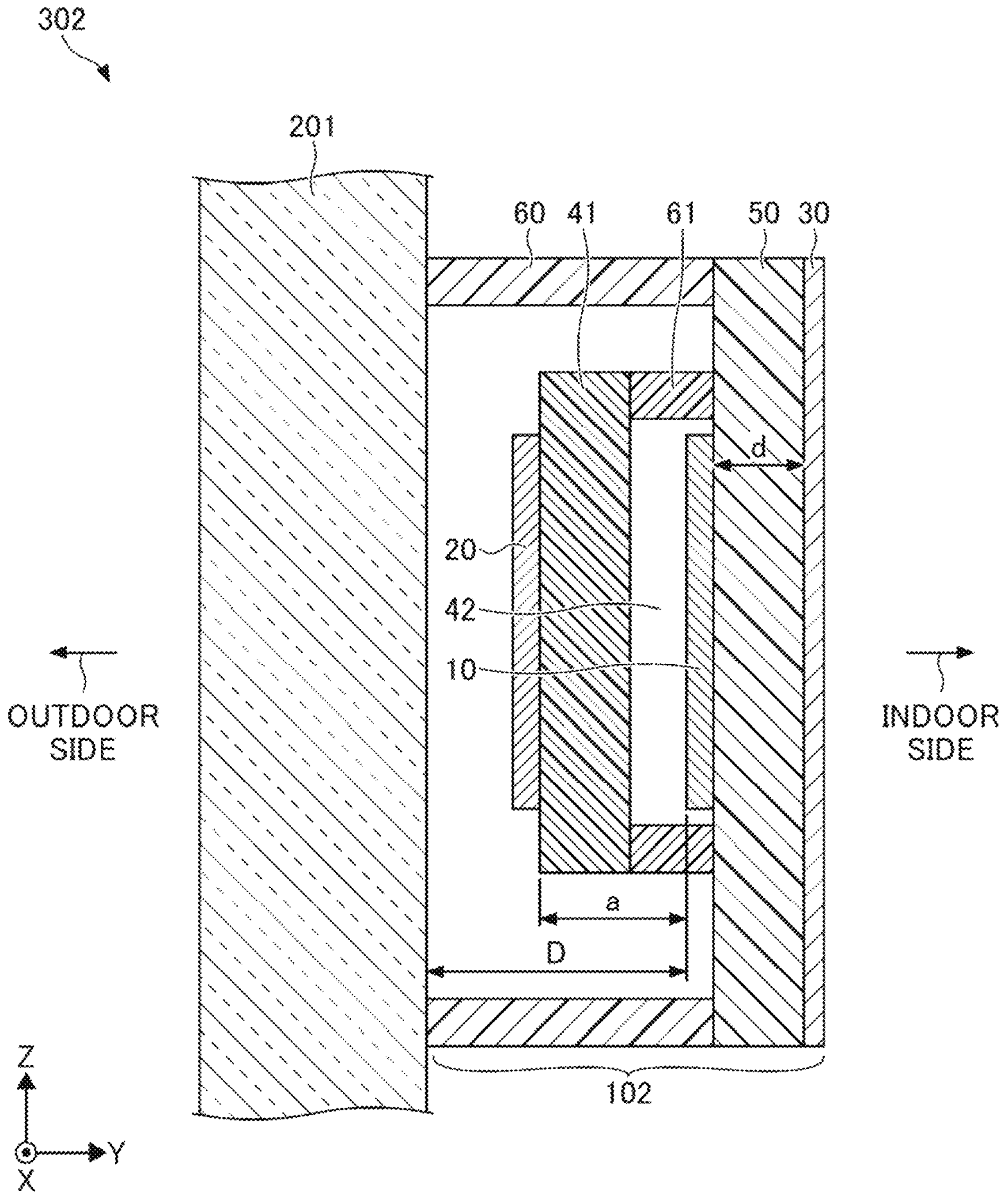
FIG. 3 is a cross sectional view schematically illustrating an example of a laminated structure of antenna unit-attached window glass according to a second embodiment.

FIG. 3 is a cross sectional view schematically illustrating an example of a laminated structure of antenna unit-attached window glass according to a second embodiment. Description about the configurations and effects similar to the above embodiment is omitted or simplified by incorporating the above description by reference. An antenna unit-attached window glass 302 includes an antenna unit 102 and a window glass 201. The antenna unit 102 is attached to the indoor-side surface of the window glass 201 for the building.

Like the above embodiment, the antenna unit 102 has a wave directing member 20 arranged between the window glass 201 and a radiating element 10, and therefore, has an improved FB ratio.

In the antenna unit 102, a dielectric member 41 is supported by a spacer 61 on a dielectric member 50, so that the indoor-side surface of the dielectric member 41 is not in contact with the radiating element 10. Specifically, the dielectric member 41 is located so that a space 42 is formed between the radiating element 10 and the dielectric member 41. The medium between the radiating element 10 and the wave directing member 20 includes both of the dielectric member 41 and the space 42. Air is present in the space 42, but gas other than air may be used. The space 42 may be a vacuum. Because the radiating element 10 is not in contact with the dielectric member 41, the resonance frequency is less affected by the dielectric member 41, and the FB ratio improves.

Because the dielectric member 41 is located so that the space 42 is formed between the radiating element 10 and the dielectric member 41, the distance a of the antenna unit 102 is preferably 2.1 mm or more in order to improve the FB ratio. The distance a is determined by the effective relative permittivities of the dielectric member 41 and the space 42. The inventors of the present application have found that, when the dielectric member 41 is located so that the space 42 is formed between the radiating element 10 and the dielectric member 41, the FB ratio can attain 0 dB or more when the distance a is set as described above.

Figure 4:
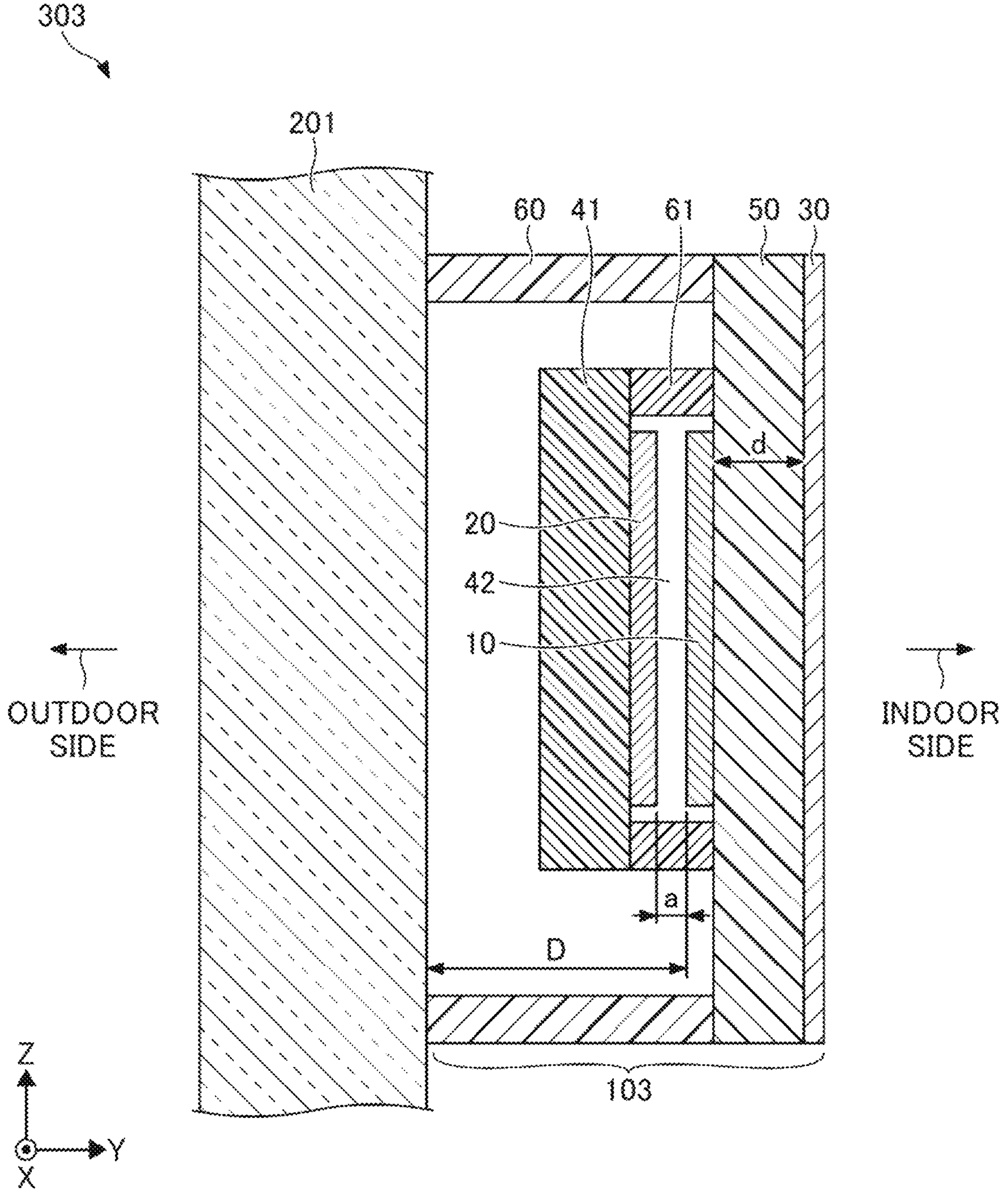
FIG. 4 is a cross sectional view schematically illustrating an example of a laminated structure of antenna unit-attached window glass according to a third embodiment.

FIG. 4 is a cross sectional view schematically illustrating an example of a laminated structure of antenna unit-attached window glass according to a third embodiment. Description about the configurations and effects similar to the embodiment above is omitted or simplified by incorporating the above description by reference. An antenna unit-attached window glass 303 includes an antenna unit 103 and a window glass 201. The antenna unit 103 is attached to the indoor-side surface of the window glass 201 for the building.

Like the above embodiment, the antenna unit 103 has a wave directing member 20 arranged between the window glass 201 and a radiating element 10, and therefore, has an improved FB ratio.

In the antenna unit 103, a dielectric member 41 is supported by a spacer 61 on a dielectric member 50, so that the wave directing member 20 formed on the indoor-side surface of the dielectric member 41 is not in contact with the radiating element 10. In other words, the antenna unit 103 includes a dielectric member 41, i.e., an example of dielectric located on the opposite side of the wave directing member 20 from the radiating element 10. The wave directing member 20 is located between the dielectric member 41 and the radiating element 10. The wave directing member 20 provided on the indoor-side surface of the dielectric member 41 is located so that the space 42 is formed between the wave directing member 20 and the radiating element 10, and the medium between the radiating element 10 and the wave directing member 20 includes only the space 42. Air is present in the space 42, but gas other than air may be used. The space 42 may be a vacuum. Because the radiating element 10 is not in contact with the dielectric member 41, and the medium between the radiating element 10 and the wave directing member 20 includes only the space 42, the resonance frequency is less affected by the dielectric member 41, and the FB ratio improves.

Because the medium between the radiating element 10 and the wave directing member 20 includes only the space 42, the distance a of the antenna unit 103 is preferably 2.3 mm or more in order to improve the FB ratio. The inventors of the present application have found that, when the medium between the radiating element 10 and the wave directing member 20 includes only the space 42, the FB ratio can attain 0 dB or more when the distance a is set as described above.

Although the dielectric member 41 is supported on the dielectric member 50 by the spacer 61, the dielectric member 41 may be supported by the support portion 60. Also, the dielectric member 41 may not be provided, and only space may exist between the wave directing member 20 and the window glass 201. In a case where nothing but space exists between the wave directing member 20 and the window glass 201, the wave directing member 20 is supported by, for example, the support portion 60 or the spacer 61.

Figure 5:
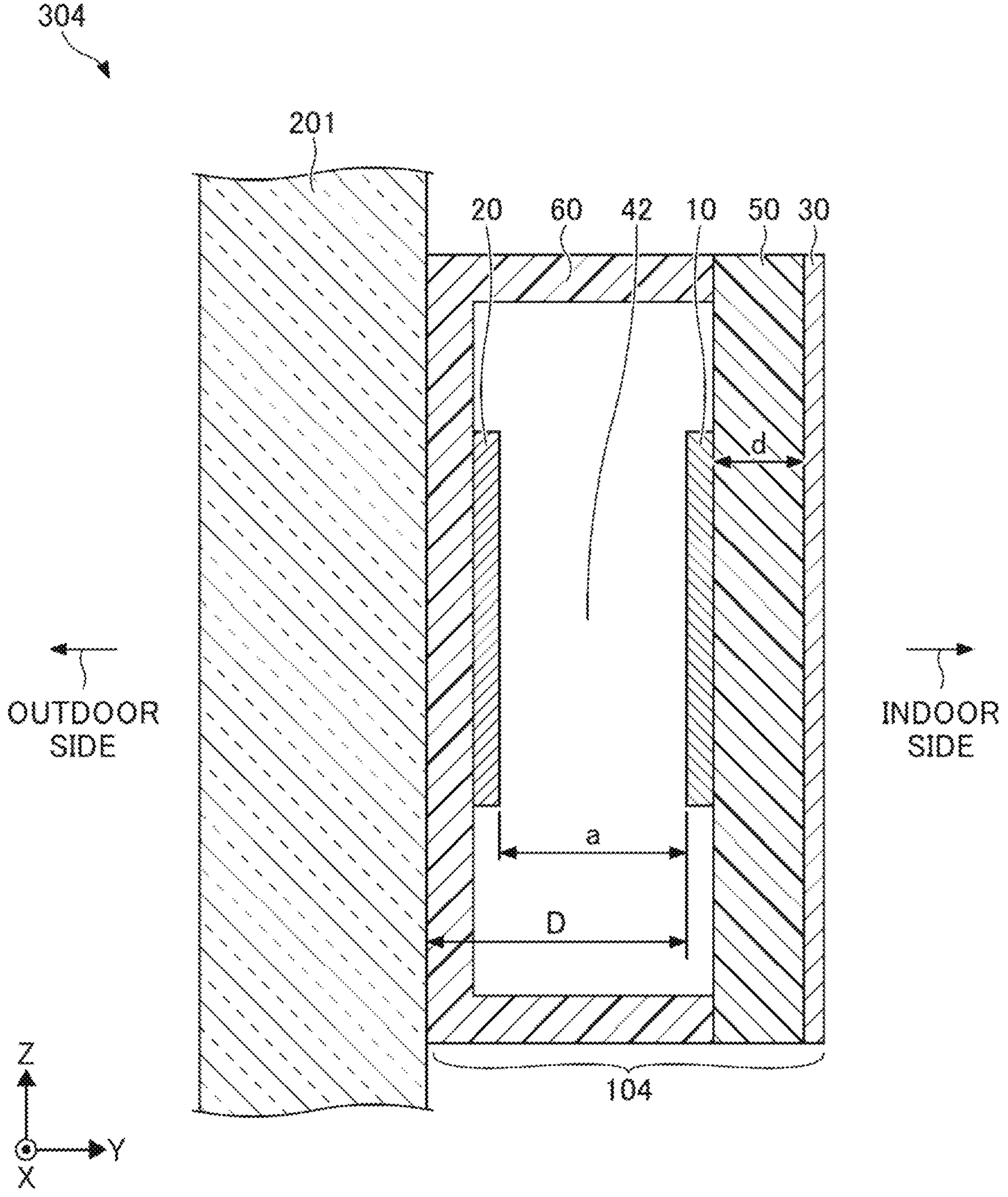
FIG. 5 is a cross sectional view schematically illustrating an example of a laminated structure of antenna unit-attached window glass according to a fourth embodiment.

FIG. 5 is a cross sectional view schematically illustrating an example of a laminated structure of antenna unit-attached window glass according to a fourth embodiment. Description about the configurations and effects similar to the above embodiment is omitted or simplified by incorporating the above description by reference. An antenna unit-attached window glass 304 includes an antenna unit 104 and a window glass 201. The antenna unit 104 is attached to the indoor-side surface of the window glass 201 for the building.

Like the above embodiment, because the antenna unit 104 has a wave directing member 20 arranged between the window glass 201 and a radiating element 10, the FB ratio improves.

In the antenna unit 104, the wave directing member 20 is formed on a support wall of a support portion 60 on the side of the window glass 201, the wave directing member 20 being formed on an inner wall surface of the support wall facing the indoor side, so that the wave directing member 20 does not come into contact with the radiating element 10. In other words, the antenna unit 104 includes (the support wall of) the support portion 60, i.e., an example of dielectric located on the opposite side of the wave directing member 20 from the radiating element 10. The wave directing member 20 is located between the support wall and the radiating element 10. The wave directing member 20 provided on the support wall of the support portion 60 is located so that the space 42 is formed between the wave directing member 20 and the radiating element 10, and the medium between the radiating element 10 and the wave directing member 20 includes only the space 42. Air is present in the space 42, but gas other than air may be used. The space 42 may be a vacuum. Because the medium between the radiating element 10 and the wave directing member 20 includes only the space 42, the FB ratio improves.

Because the medium between the radiating element 10 and the wave directing member 20 includes only the space 42, the distance a of the antenna unit 104 is preferably 2.3 mm or more in order to improve the FB ratio.

Figure 6:
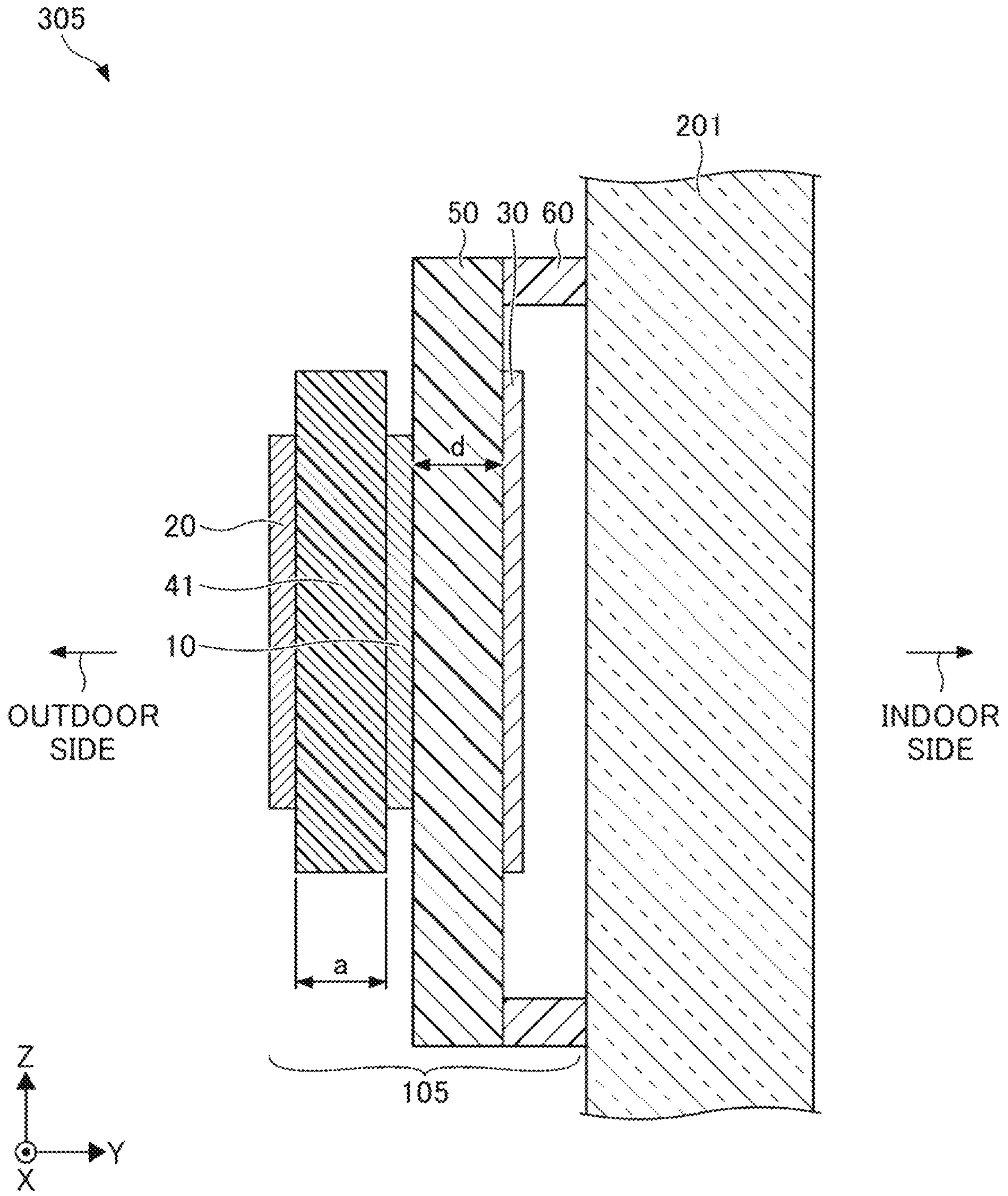
FIG. 6 is a cross sectional view schematically illustrating an example of a laminated structure of antenna unit-attached window glass according to a fifth embodiment.

FIG. 6 is a cross sectional view schematically illustrating an example of a laminated structure of antenna unit-attached window glass according to a fifth embodiment. Description about the configurations and effects similar to the above embodiment is omitted or simplified by incorporating the above description by reference. An antenna unit-attached window glass 305 includes an antenna unit 105 and a window glass 201. The antenna unit 105 is attached to an outdoor-side surface of window glass 201 for the building.

The antenna unit 105 has the same laminated structure as the antenna unit 101 (see FIG. 2). However, the antenna unit 105 is different from the antenna unit 101 in that the radiating element 10 is located between the window glass 201 and the wave directing member 20.

Because, in the antenna unit 105, the wave directing member 20 is arranged at the opposite side (i.e., the outdoor side) of the radiating element 10 from the window glass 201 side in located at the indoor this manner, the electromagnetic waves radiated from the radiating element 10 toward outdoor side can be narrowed by the wave directing member 20, and the reflection of the electromagnetic waves at the interface of the window glass 201 located at the indoor side of the radiating element 10 can be reduced, and therefore, the FB ratio improves. As a result, the gain of the electromagnetic waves radiated in a direction normal to the surface of the window glass 201 increases, and the reflection to the back (indoor side) of the radiating element 10 decreases, so that the FB ratio improves. Also, the distance a is preferably $(2.11\times\varepsilon_r-1.82)$ mm or more in order to improve the FB ratio.

It should be noted that the antenna unit attached to the outdoor side of the window glass 201 is not limited to the antenna unit 105 of FIG. 6. For example, an antenna unit having the same laminated structure as the antenna unit 102 of FIG. 3, the antenna unit 103 of FIG. 4, or the antenna unit 104 of FIG. 5 may be attached to the outdoor side of the window glass 201.

Figure 7:
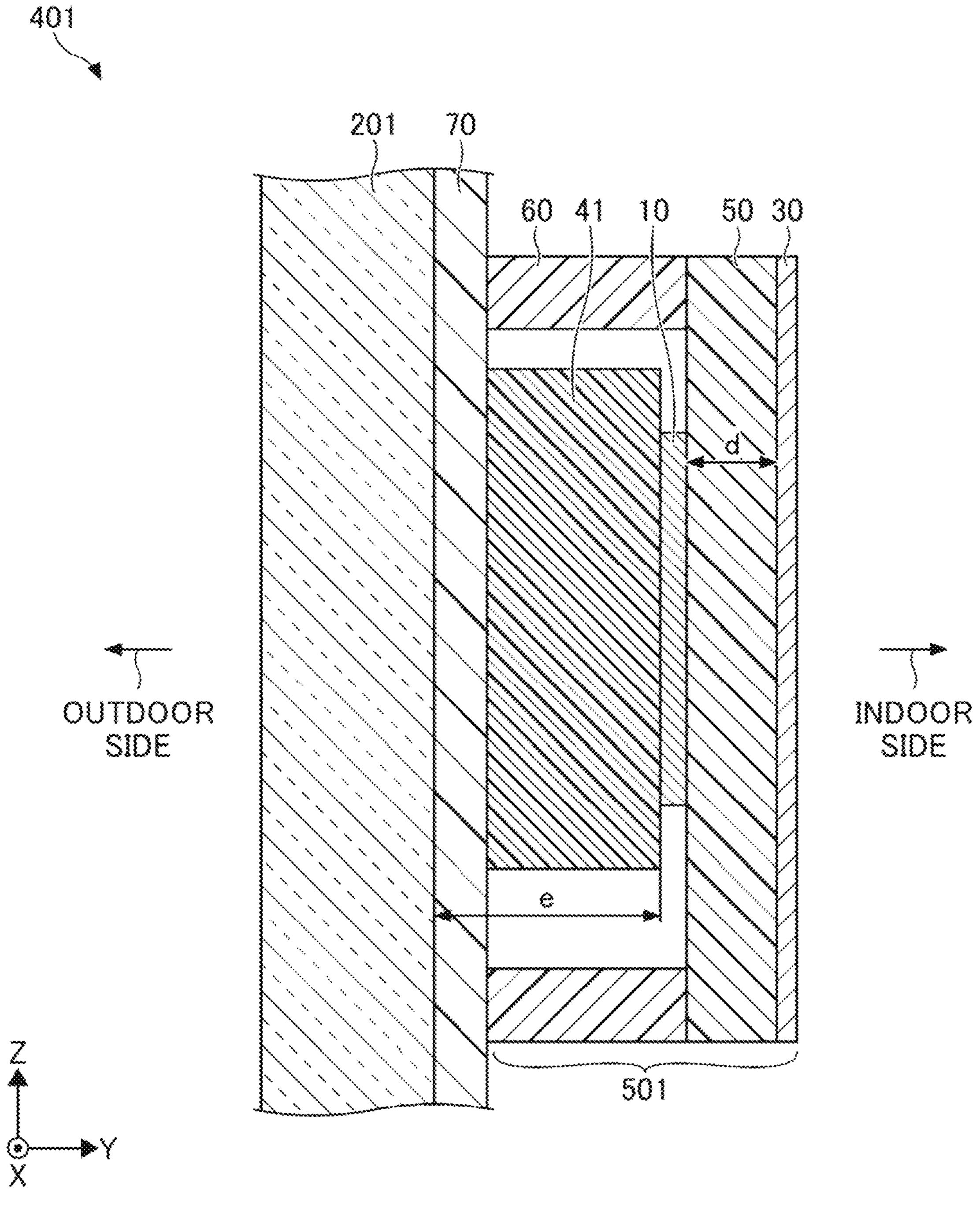
FIG. 7 is a cross sectional view schematically illustrating an example of a laminated structure of antenna unit-attached window glass according to a sixth embodiment.

FIG. 7 is a cross sectional view schematically illustrating an example of a laminated structure of antenna unit-attached window glass according to a sixth embodiment. Description about the configurations and effects similar to the above embodiment is omitted or simplified by incorporating the above description by reference. An antenna unit-attached window glass 401 includes an antenna unit 501 and a window glass 201. The antenna unit 501 is attached to the indoor-side surface of the window glass 201 for a building.

The antenna unit 501 includes: a radiating element 10 located so that a matching member 70 is interposed between the radiating element 10 and the window glass 201; and a conductor 30 located so that the radiating element 10 is interposed between the conductor 30 and a matching member 70.

The matching member 70 is an example of a matching body for matching the mismatch of the impedance between the window glass 201 and the medium existing between the radiating element 10 and the window glass 201. Because the mismatch of the impedance is adjusted, the electromagnetic waves radiated from the radiating element 10 to the window glass 201 are suppressed from being reflected by the interface of the window glass 201, and therefore, the FB ratio improves.

Where the relative permittivity of the window glass 201 is denoted as $\varepsilon_r1$, the relative permittivity of the matching member 70 is denoted as $\varepsilon_r2$, and the relative permittivity of the medium between the matching member 70 and the radiating element 10 is denoted as $\varepsilon_r3$, it is preferable that $\varepsilon_r1$ be larger than $\varepsilon_r2$ and $\varepsilon_r2$ be larger than $\varepsilon_r3$. Accordingly, the electromagnetic waves radiated from the radiating element 10 propagate, with reduction in the reflection loss, through the medium between the matching member 70 and the radiating element 10, through the matching member 70, and then through the window glass 201, and therefore the FB ratio improves.

Where the distance between the window glass 201 and the radiating element 10 is denoted as e, and the relative permittivity of the matching member 70 is denoted as $\varepsilon_r2$, the distance e is preferably $(-0.57\times\varepsilon_r2+30.1)$ mm or more in order to improve the FB ratio. The inventors of the present application have found that the FB ratio can be 0 dB or more by setting the distance e as described above. The upper limit of the distance e is not particularly limited, but the distance e may be 100 mm or less, may be 50 mm or less, may be 30 mm or less, may be 20 mm or less, or may be 10 mm or less. The relative permittivity $\varepsilon_r 2$ may be 100 or less, may be 50 or less, or may be 20 or less.

Subsequently, a configuration including the matching member 70 is explained in more detail.

The matching member 70 is provided on the window glass 201. In the present embodiment, the matching member 70 is provided on the indoor-side surface of the window glass 201. The antenna unit 501 is attached to the indoor-side surface of the window glass 201 with the matching member 70.

The dielectric member 41 is an example of the medium between the matching member 70 and the radiating element 10. In the antenna unit-attached window glass 401, the dielectric member 41 is arranged between the matching member 70 and the radiating element 10 to be in contact with the matching member 70 and the radiating element 10, but the dielectric member 41 may not be in contact with the matching member 70 and the radiating element 10.

Figure 8:
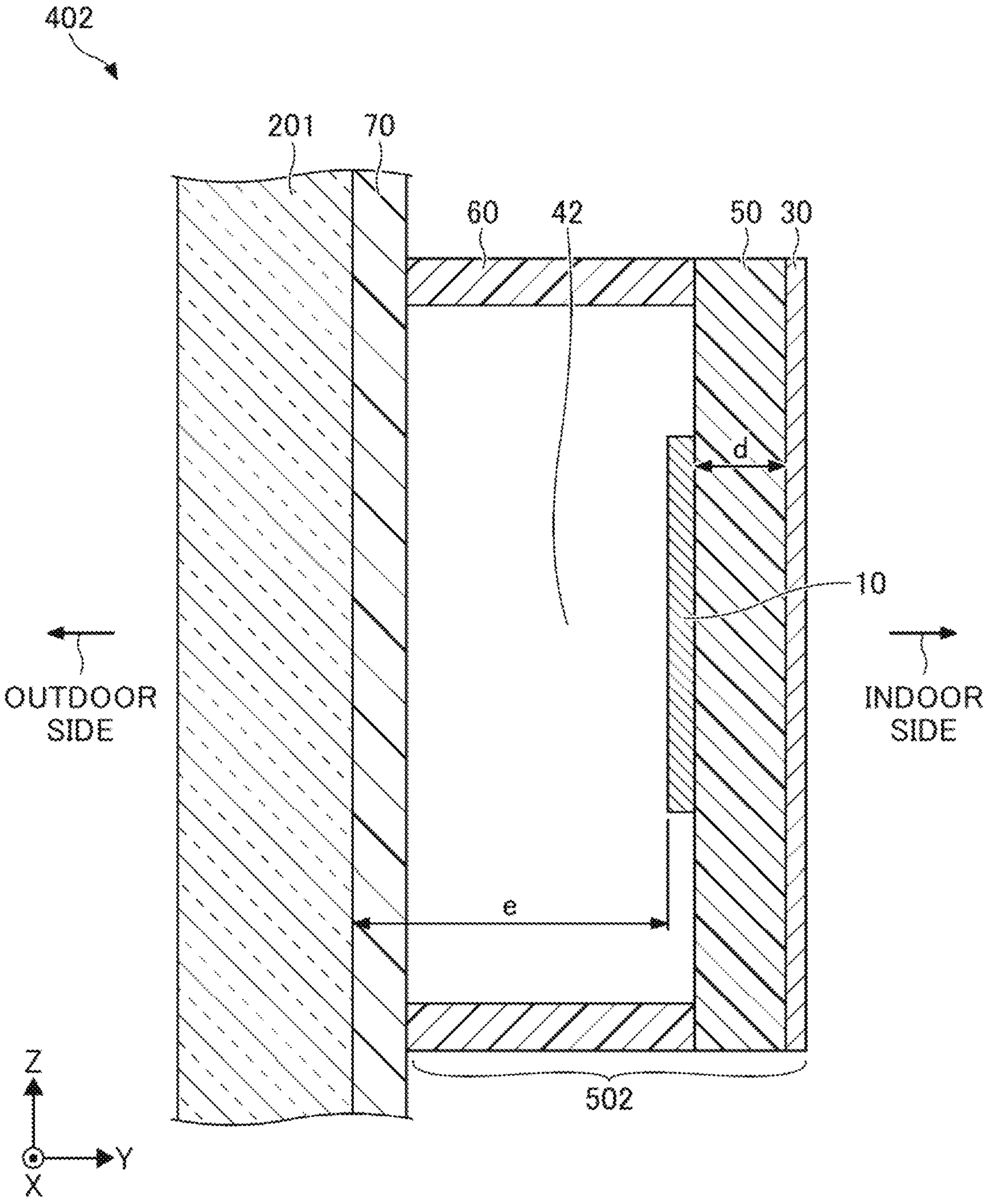
FIG. 8 is a cross sectional view schematically illustrating an example of a laminated structure of antenna unit-attached window glass according to a seventh embodiment.

FIG. 8 is a cross sectional view schematically illustrating an example of a laminated structure of antenna unit-attached window glass according to a seventh embodiment. Description about the configurations and effects similar to the above embodiment is omitted or simplified by incorporating the above description by reference. An antenna unit-attached window glass 402 includes an antenna unit 502 and a window glass 201. The antenna unit 502 is attached to the indoor-side surface of the window glass 201 for the building. The antenna unit 502 is different from the antenna unit 501 in that the medium between the matching member 70 and the radiating element 10 is the space 42. Gas such as air is present in the space 42. The space 42 may be a vacuum.

Figure 9:
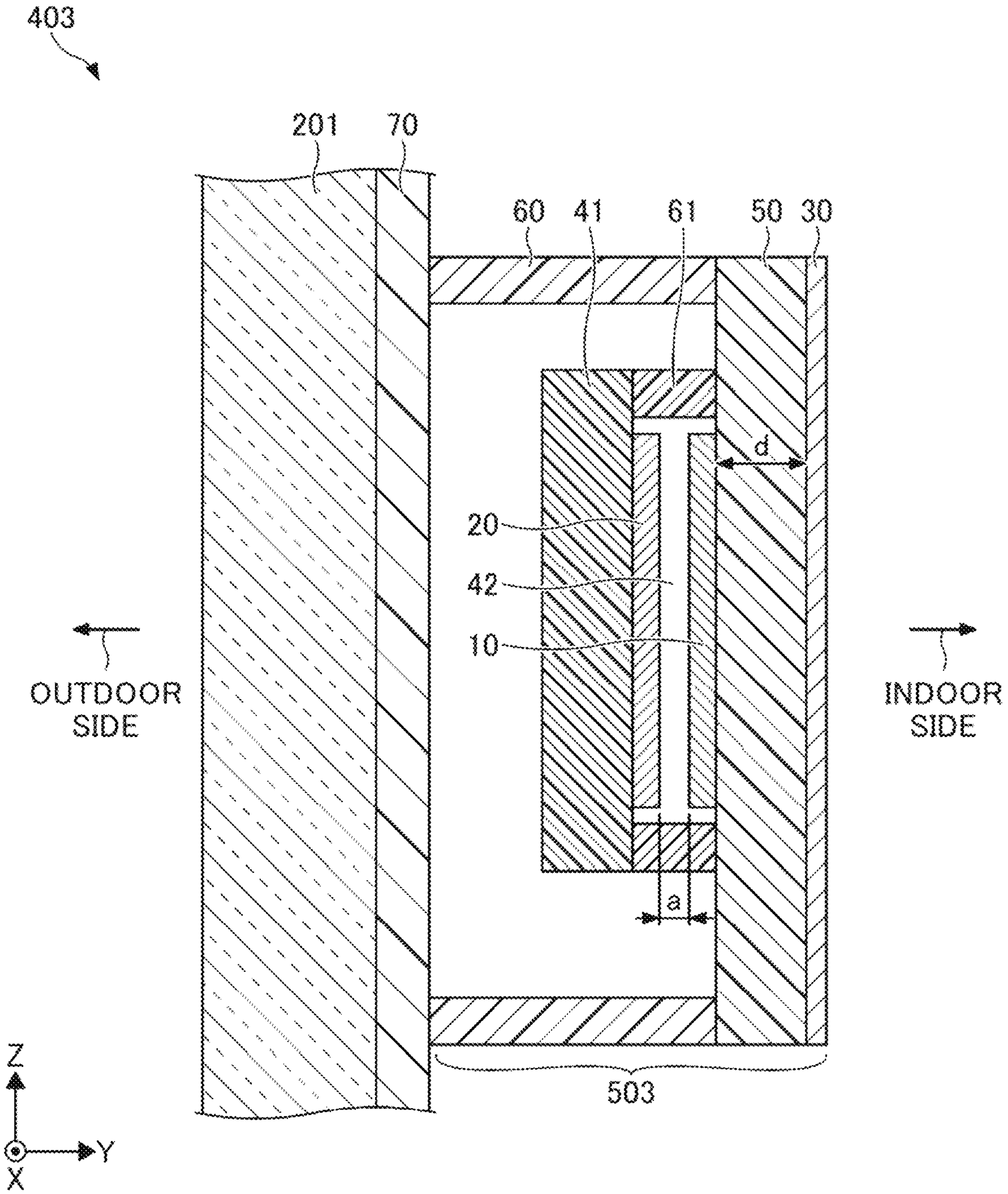
FIG. 9 is a cross sectional view schematically illustrating an example of a laminated structure of antenna unit-attached window glass according to an eighth embodiment.

FIG. 9 is a cross sectional view schematically illustrating an example of a laminated structure of antenna unit-attached window glass according to an eighth embodiment. Description about the configurations and effects similar to above is omitted the embodiment or simplified by incorporating the above description by reference. An antenna unit-attached window glass 403 includes an antenna unit 503 and a window glass 201. The antenna unit 503 is attached to the indoor-side surface of the window glass 201 for the building.

The antenna unit 503 has the same laminated structure as the antenna unit 103 (see FIG. 4). Specifically, the antenna unit 503 is used by being attached to the window glass 201 so that a matching member 70 is interposed between the window glass 201 and a wave directing member 20.

Like the above embodiment, the distance a is preferably $(2.11\times\varepsilon_r-1.82)$ mm or more in order to improve the FB ratio. Where the relative permittivity of the window glass 201 is denoted as $\varepsilon_r 1$, the relative permittivity of the matching member 70 is denoted as $\varepsilon_r 2$, and the relative permittivity of the medium between the matching member 70 and the radiating element 10 is denoted as $\varepsilon_r 3$, it is preferable that $\varepsilon_r 1$ be larger than $\varepsilon_r 2$ and $\varepsilon_r 2$ be larger than $\varepsilon_r 3$ in order to improve the FB ratio.

It should be noted that the antenna unit attached to the indoor side of the window glass 201 with the matching member 70 is not limited to the antenna unit 503 of FIG. 9. For example, the antenna unit having the same laminated structure as the antenna unit 101 of FIG. 2, the antenna unit 102 of FIG. 3, or the antenna unit 104 of FIG. 5 may be attached to the indoor side of the window glass 201 with the matching member 70.

In the antenna unit-attached window glass as illustrated in FIGS. 7 to 9, a conductor may be provided between the matching member 70 and the window glass 201. When a conductor is provided between the matching member 70 and the window glass 201, the thickness of the matching member 70 can be reduced. For example, the conductor provided between the matching member 70 and the window glass 201 is a conductor pattern having a Frequency Selective Surface (FSS) formed with a mesh or slit pattern and the like to pass electromagnetic waves in a predetermined frequency range. The conductor provided between the matching member 70 and the window glass 201 may be a meta-surface. The conductor may not be provided between the matching member 70 and the window glass 201.

Where the distance between the radiating element 10 and the conductor 30 is denoted as d, and the wavelength of the operation frequency of the radiating element 10 is denoted as $\lambda_g$, the distance d is preferably $\lambda_g/4$ or less in order to improve the FB ratio.

The thickness of the window glass 201 is preferably 1.0 to 20 mm. When the thickness of the window glass 201 is 1.0 mm or more, the window glass 201 has a sufficient strength to attach the antenna unit. Also, when the thickness of the window glass 201 is 20 mm or less, a high electromagnetic wave penetration performance is attained. The thickness of the window glass 201 is more preferably 3.0 to 15 mm and still more preferably 9.0 to 13 mm.

The size of area of the dielectric member 50 is preferably 0.01 to 4 $m^2$. When the size of area of the dielectric member 50 is 0.01 $m^2$ or more, the radiating element 10, the conductor 30, and the like can be easily formed. When the size of area of the dielectric member 50 is 4 $m^2$ or less, the antenna unit is inconspicuous and good in design in terms of appearance. The size of area of the dielectric member 50 is more preferably 0.05 to 2 $m^2$.

Figure 10:
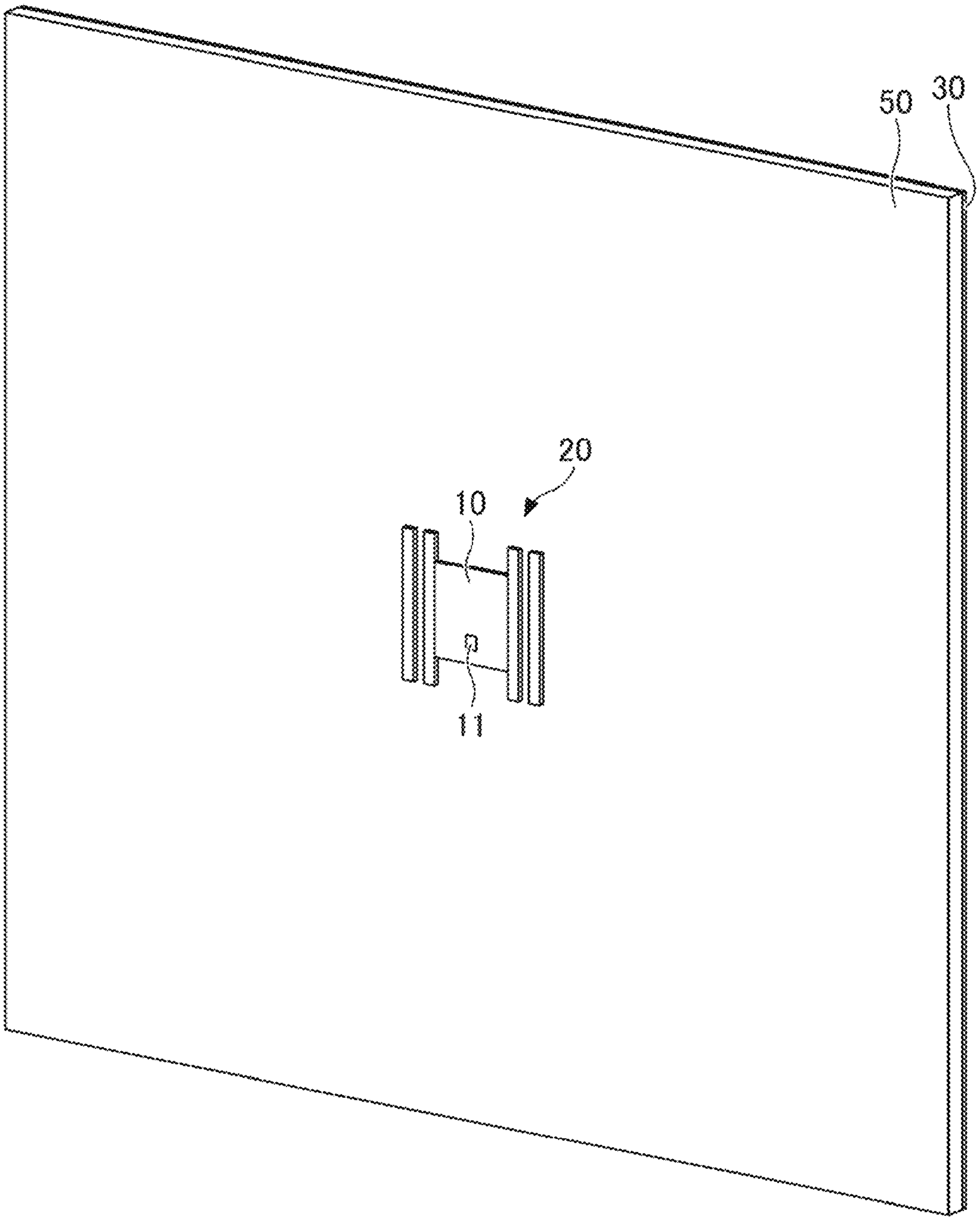
FIG. 10 is a perspective view illustrating a concrete example of configuration of an antenna unit according to the present embodiment.
Figure 11:
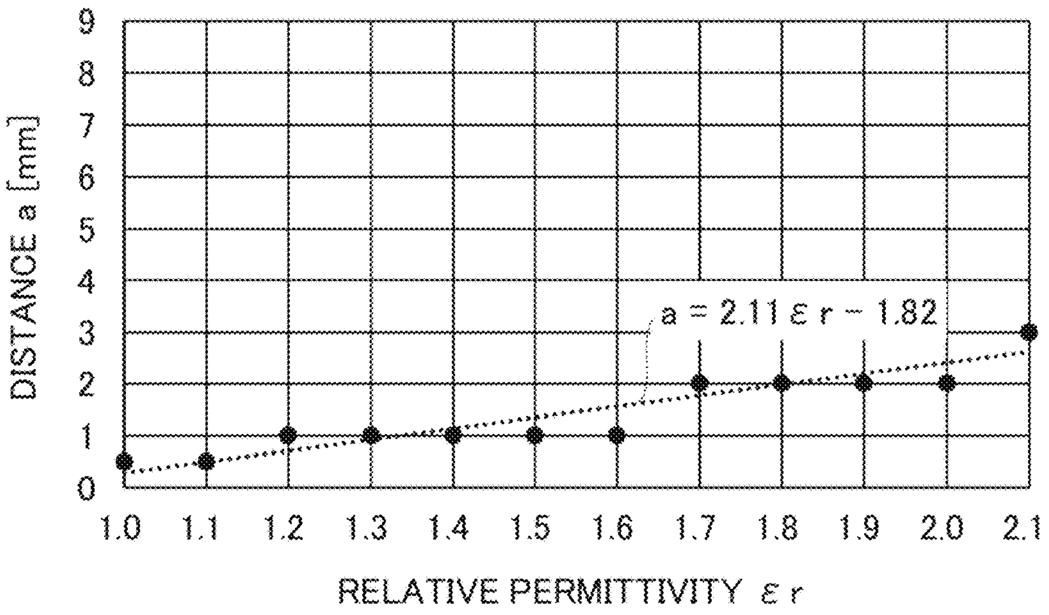
FIG. 11 is a figure illustrating, in the antenna unit as illustrated in FIG. 10, a relationship between a distance a, between the radiating element and the wave directing member, and a relative permittivity $\varepsilon_r$ of a medium between the radiating element and the wave directing member.

FIG. 10 is a perspective view illustrating a concrete example of configuration of an antenna unit according to the present embodiment. A radiating element 10 is fed at a feeding point 11. The wave directing member 20 includes multiple (specifically, four) conductor elements in line segments arranged parallel to each other FIG. 11 is a figure illustrating a relationship between the distance a, between the radiating element 10 and the wave directing member 20, and the relative permittivity $\varepsilon_r$ of the medium between the radiating element 10 and the wave directing member 20, in a simulation in which the antenna unit as illustrated in FIG. 10 was attached to the window glass 201 as illustrated in FIG. 2. A broken line as illustrated in FIG. 11 represents a regression curve where the FB ratio becomes 0 dB, and when the distance a is $(2.11\times\varepsilon_r-1.82)$ mm or more, the FB ratio becomes 0 dB or more.

It should be noted that the calculation conditions of FIG. 11 were as follows.

Radiating element 10: a square patch with 18.0 mm in height 18.0 mm in width Wave directing member 20: (four) line segment shapes with 30.0 mm in length and 2.0 mm in width Window glass 201: a glass plate with 300 mm in height, 300 mm in width, and 6 mm in thickness Dielectric member 50: a glass substrate with 200 mm in height, 200 mm in width, and 3.3 mm in thickness, having polyvinyl butyral as an inner layer with 200 mm in height, 200 mm in width, and 0.76 mm in thickness Conductor 30: a square with 200 mm in height and 200 mm in width Support portion 60: not provided The simulation was performed with the distance a between the radiating element 10 and the wave directing member 20 being in a range of 0.5 to 9.0 mm and with the relative permittivity $\varepsilon_r$ of the medium between the radiating element 10 and the wave directing member 20 being in a range of 1.0 to 2.2. It should be noted that the simulation was performed with the operation frequency of the radiating element 10 being 3.5 GHZ. The simulation was performed using an electromagnetic field simulator (Microwave Studio (registered trademark) produced by CST).

Figure 19:
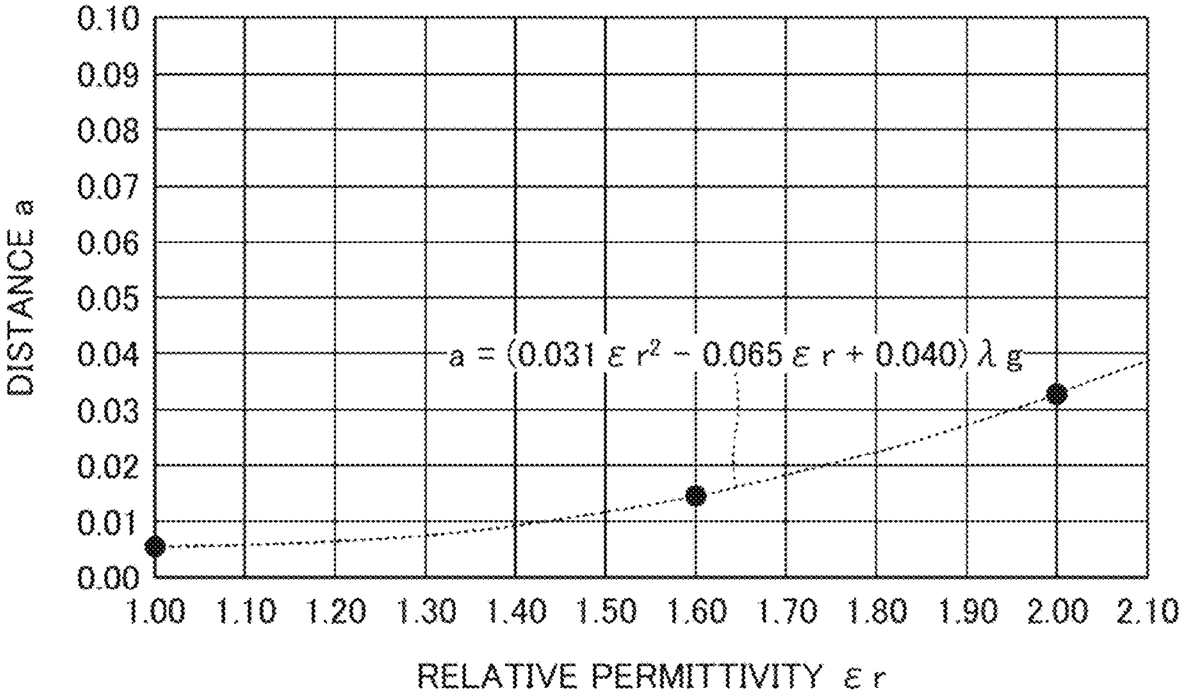
FIG. 19 is a figure illustrating a relationship between a distance a (normalized with respect to $\lambda_g$), between the radiating element and the wave directing member, and a relative permittivity $\varepsilon_r$ of a medium between the radiating element and the wave directing member in the antenna unit as illustrated in FIG. 10.

FIG. 19 is a figure illustrating a relationship between the distance a, between the radiating element 10 and the wave directing member 20, and the relative permittivity ¿, of the medium between the radiating element 10 and the wave directing member 20, in a simulation in which the antenna unit as illustrated in FIG. 10 was attached to the window glass 201 as illustrated in FIG. 2. A broken line as illustrated in FIG. 19 represents a regression curve where the FB ratio becomes 0 dB, when the distance a as illustrated in FIG. 11 is normalized with 1 wavelength (=85.7 mm) of the operation frequency of the radiating element 10, i.e., 3.5 GHz. Where the wavelength of the operation frequency of the radiating element 10 was denoted as $\lambda_g$, the FB ratio became 0 dB or more when the distance a becomes $(0.031\times\varepsilon_r^2-0.065\times\varepsilon_r+0.040)\times\lambda_g$ or more. It should be noted that the calculation conditions of FIG. 19 are the same as the calculation conditions of FIG. 11.

Figure 12:
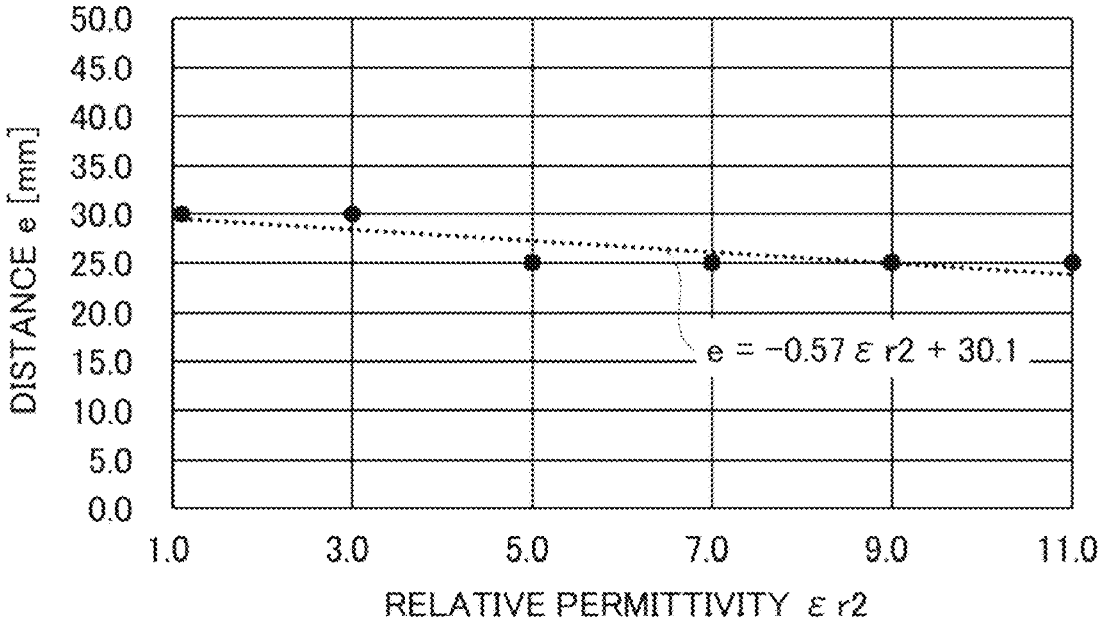
FIG. 12 is a figure illustrating a relationship between a distance e, between the radiating element and the window glass, and the relative permittivity $\varepsilon_r2$ of the matching body in the antenna unit as illustrated in FIG. 10.

FIG. 12 is a figure illustrating a relationship between the distance e between the radiating element 10 and the window glass 201 and the relative permittivity $\varepsilon_r2$ of the matching member 70, in a simulation in which the antenna unit as illustrated in FIG. 10 is attached to the window glass 201 with the matching member 70 as illustrated in FIG. 8. A broken line as illustrated in FIG. 12 represents a regression curve where the FB ratio becomes 0 dB, and when the distance e is $(-0.57\times\varepsilon_r2+30.1)$ mm or more, the FB ratio becomes 0 dB or more.

The measurement conditions of FIG. 12 were the same as the measurement conditions of FIG. 11 except that the wave directing member 20 is not provided. The simulation is performed with the distance e between the radiating element 10 and the window glass 201 being in a range of 20 to 40 mm and with $\varepsilon_r$ of the matching member 70 being in a range of 1.0 to 11.0.

Figure 20:
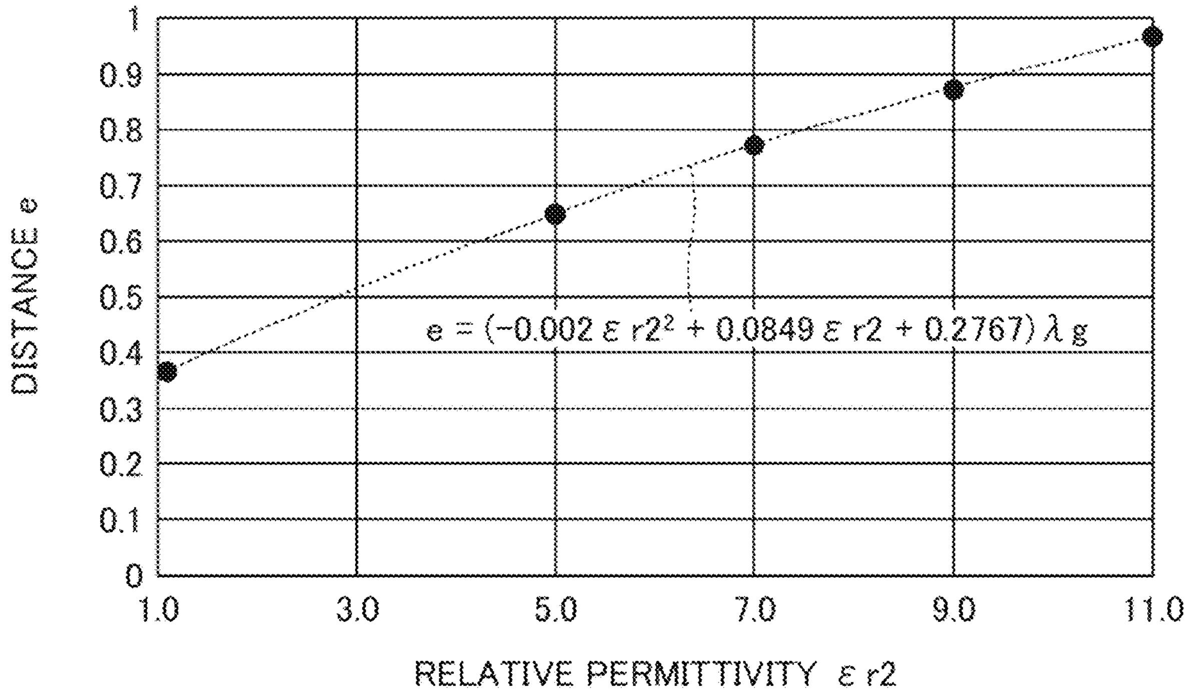
FIG. 20 is a figure illustrating a relationship between a distance e (normalized with respect to $\lambda_g$), between the radiating element and the window glass, and a relative permittivity $\varepsilon_r$ of the matching body in the antenna unit as illustrated in FIG. 10.

FIG. 20 is a figure illustrating a relationship between the distance e between the radiating element 10 and the window glass 201 and the relative permittivity $\varepsilon_r2$ of the matching member 70, in a simulation in which the antenna unit as illustrated in FIG. 10 is attached to the window glass 201 with the matching member 70 as illustrated in FIG. 8. A broken line as illustrated in FIG. 20 represents a regression curve where the FB ratio becomes 0 dB, when the distance e as illustrated in FIG. 12 is normalized with 1 wavelength (=85.7 mm) of the operation frequency of the radiating element 10, i.e., 3.5 GHz. The wavelength of the operation frequency of the radiating element 10 was denoted as $\lambda_g$, and when the distance e was $(-0.002\times\varepsilon_r2^2+0.0849\times\varepsilon_r2+0.2767)\times\lambda_g$ or more, the FB ratio became 0 dB or more. It should be noted that the calculation conditions of FIG. 20 are the same as the calculation conditions of FIG. 12.

Figure 13:
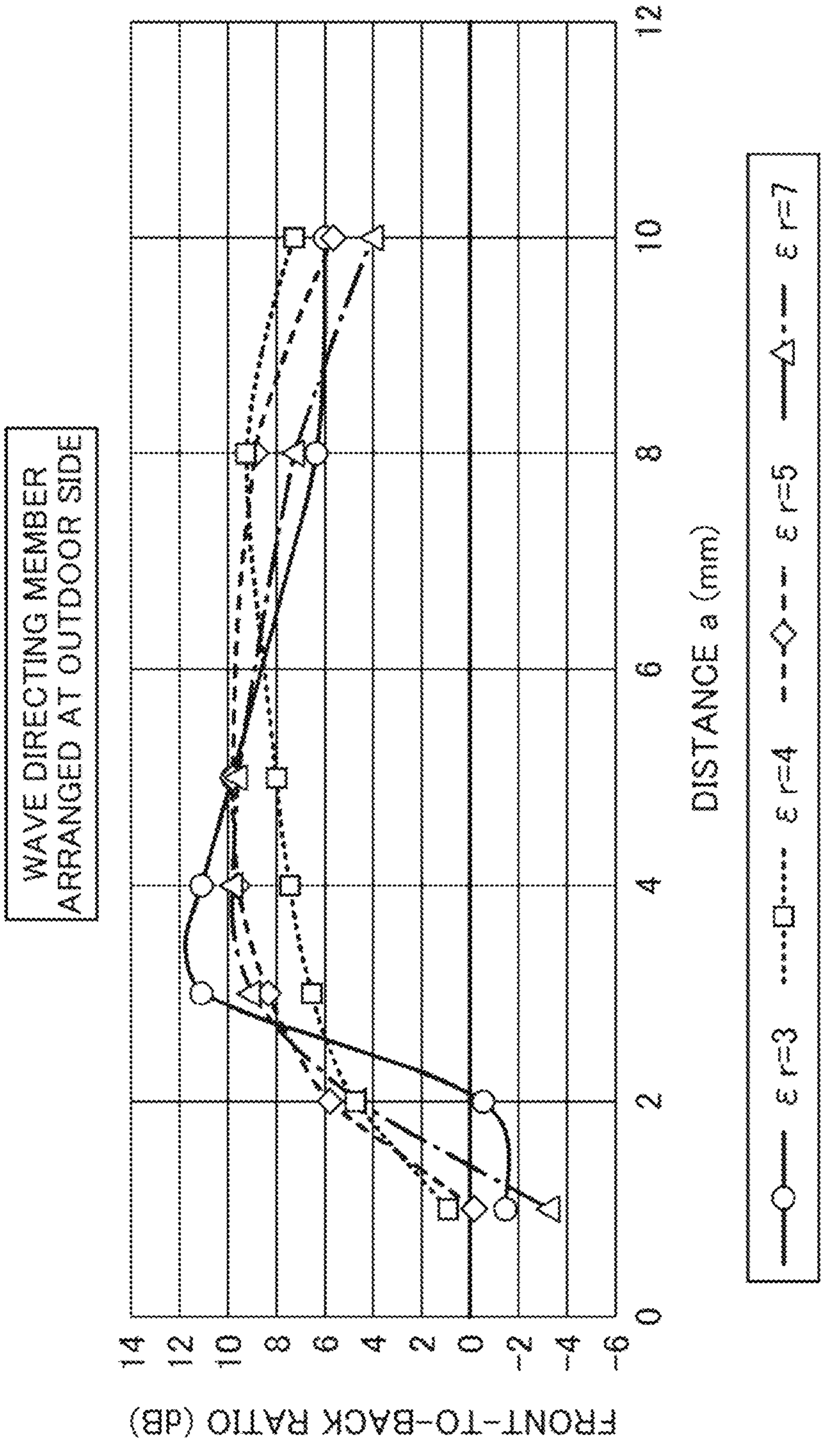
FIG. 13 is a figure illustrating an example of relationship between an FB ratio and a distance a between a radiating element and a wave directing member in an antenna unit-attached window glass in which a wave directing member is provided on an outdoor side of a dielectric member.
Figure 14:
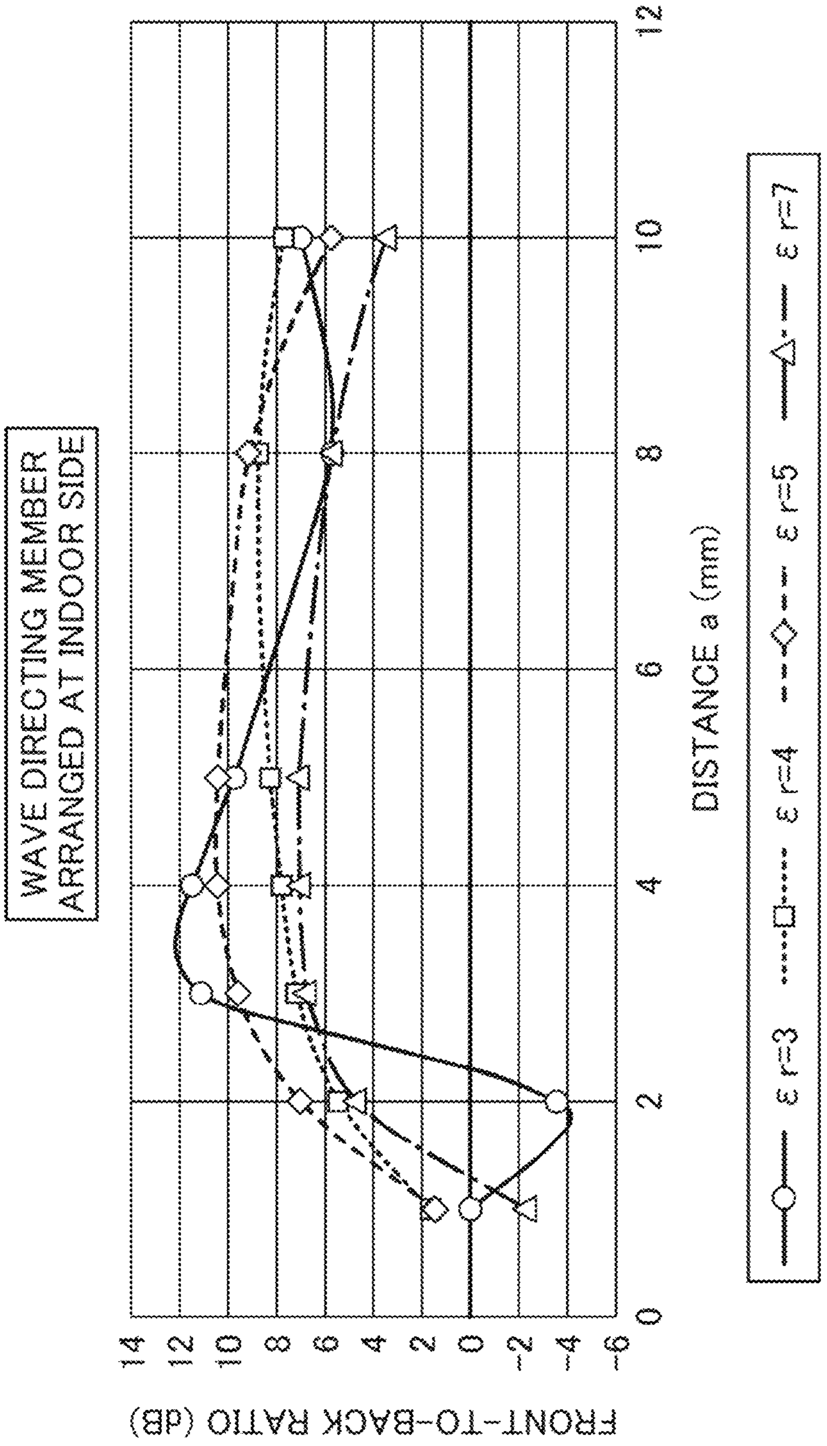
FIG. 14 is a figure illustrating an example of relationship between an FB ratio and a distance a between a radiating element and a wave directing member in an antenna unit-attached window glass in which a wave directing member is provided on an indoor side of a dielectric member.

FIG. 13 is a figure illustrating an example of relationship between the distance a, between the radiating element 10 and the wave directing member 20, and the FB ratio, when the relative permittivity $\varepsilon_r$ of the dielectric member 41 was changed, in the antenna unit-attached window glass 302 in which the wave directing member 20 was attached to the outdoor side of the dielectric member 41. FIG. 14 is a figure illustrating an example of relationship between the distance a, between the radiating element 10 and the wave directing member 20, and the FB ratio, when the relative permittivity $\varepsilon_r$ of the dielectric member 41 was changed, in the antenna unit-attached window glass 303 in which the wave directing member 20 was attached to the indoor side of the dielectric member 41. In FIGS. 13, 14, the thickness of the dielectric member 41 was 1 mm.

In the configuration of FIG. 13, where the distance a is set to about 2.1 mm or more, the FB ratio becomes 0 dB or more. In the configuration of FIG. 14, where the distance a is set to about 2.3 mm or more, the FB ratio becomes 0 dB or more.

Figure 15:
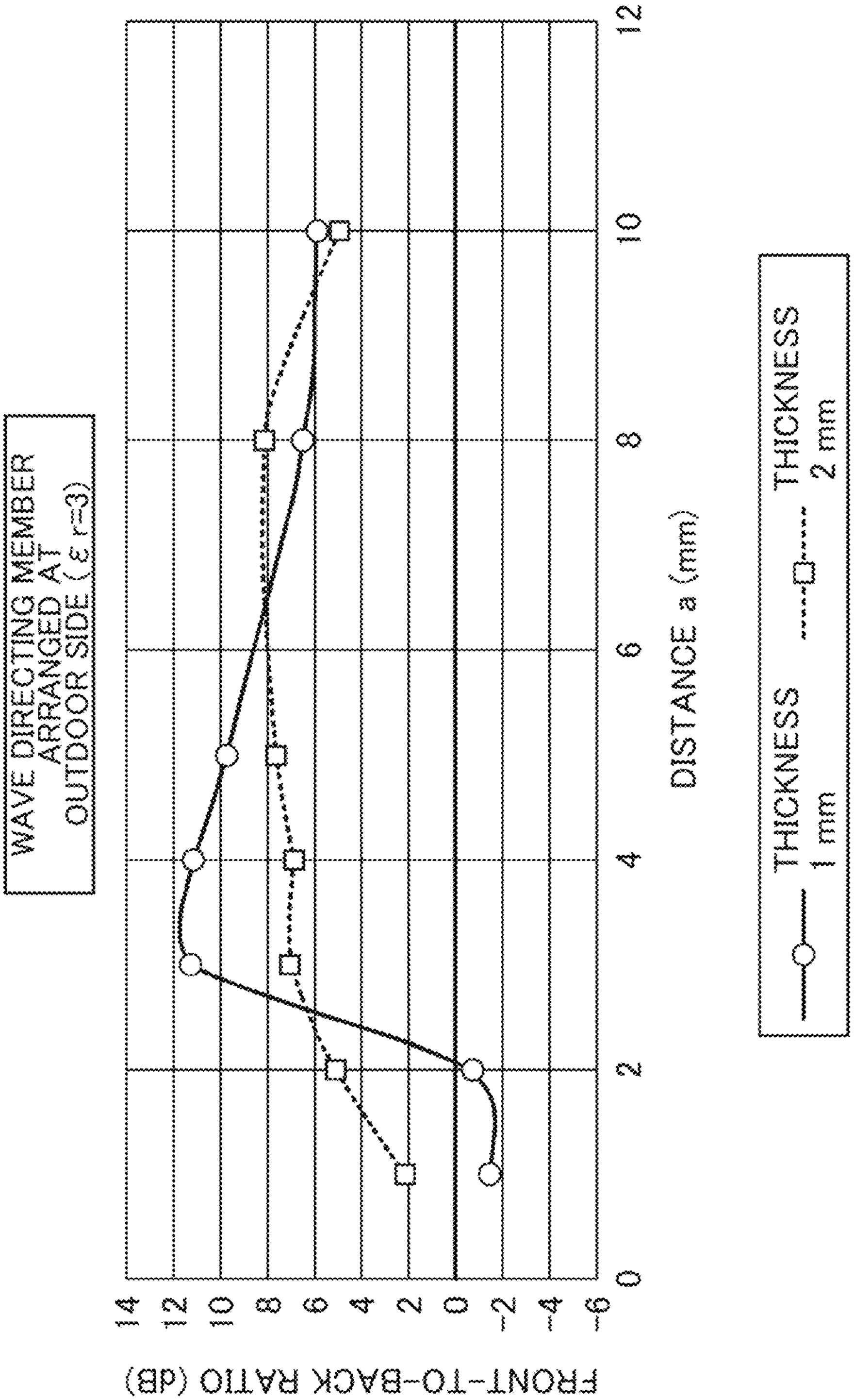
FIG. 15 is a figure (part 1) illustrating an example of relationship between an FB ratio and a distance a between a radiating element and a wave directing member in an antenna unit-attached window glass in which a wave directing member is provided on an outdoor side of a dielectric member.
Figure 16:
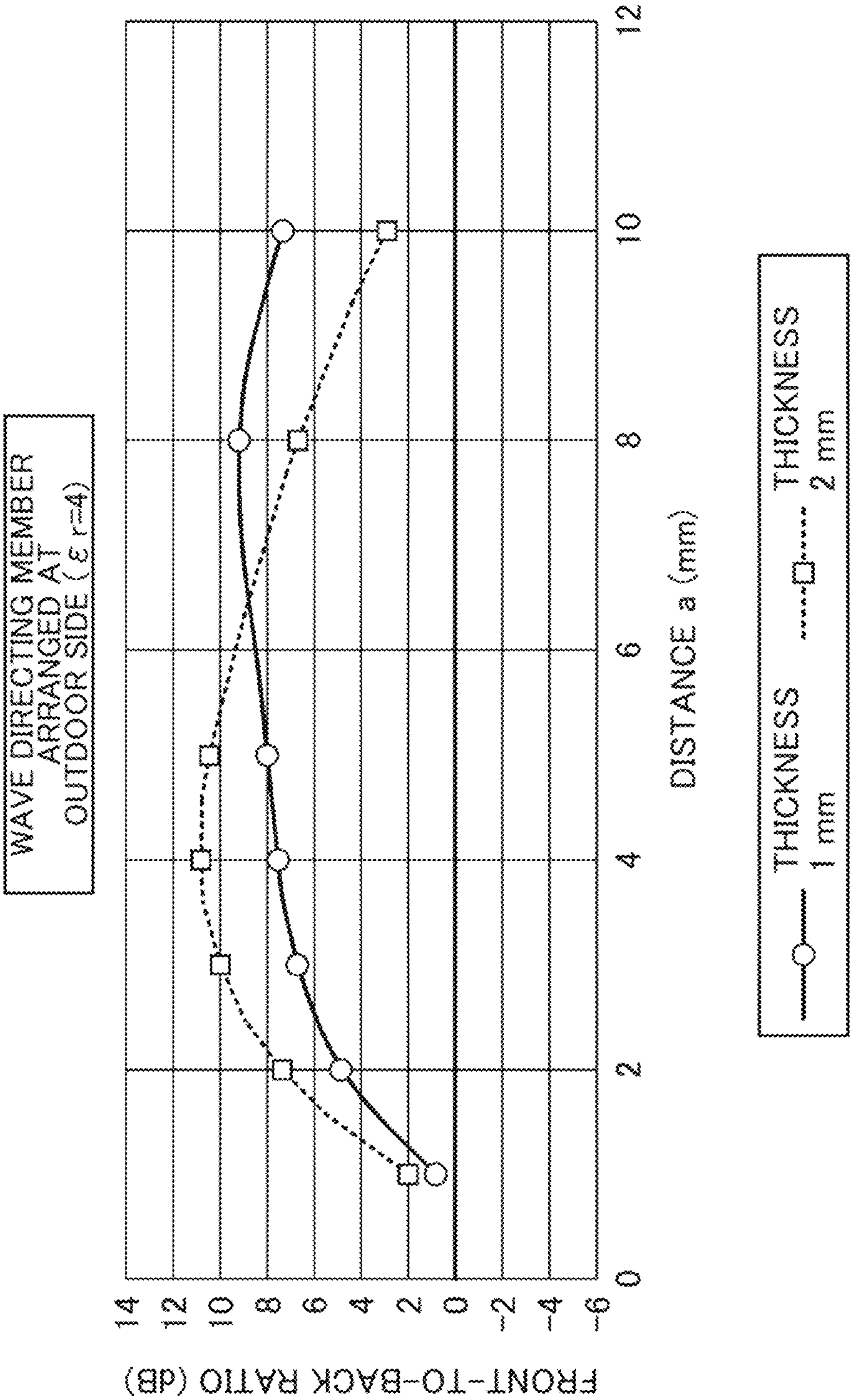
FIG. 16 is a figure (part 2) illustrating an example of relationship between the FB ratio and the distance a between the radiating element and the wave directing member in the antenna unit-attached window glass in which the wave directing member is provided on the outdoor side of the dielectric member.

FIGS. 15, 16 are figures illustrating examples of relationships between the distance a, between the radiating element 10 and the wave directing member 20, and the FB ratio, when the thickness of the dielectric member 41 was changed, in the antenna unit-attached window glass 302 in which the wave directing member 20 is provided on the outdoor side of the dielectric member 41. In the case of FIG. 15, the relative permittivity of the dielectric member 41 was 3. In the case of FIG. 16, the relative permittivity of the dielectric member 41 was 4. In a range in which the distance a is 2.5 mm or more and 6 mm or less, a thinner thickness resulted in a higher FB ratio in FIG. 15 with the relative permittivity being 3, whereas a thicker thickness resulted in a higher FB ratio in FIG. 16 with the relative permittivity being 4.

Figure 17:
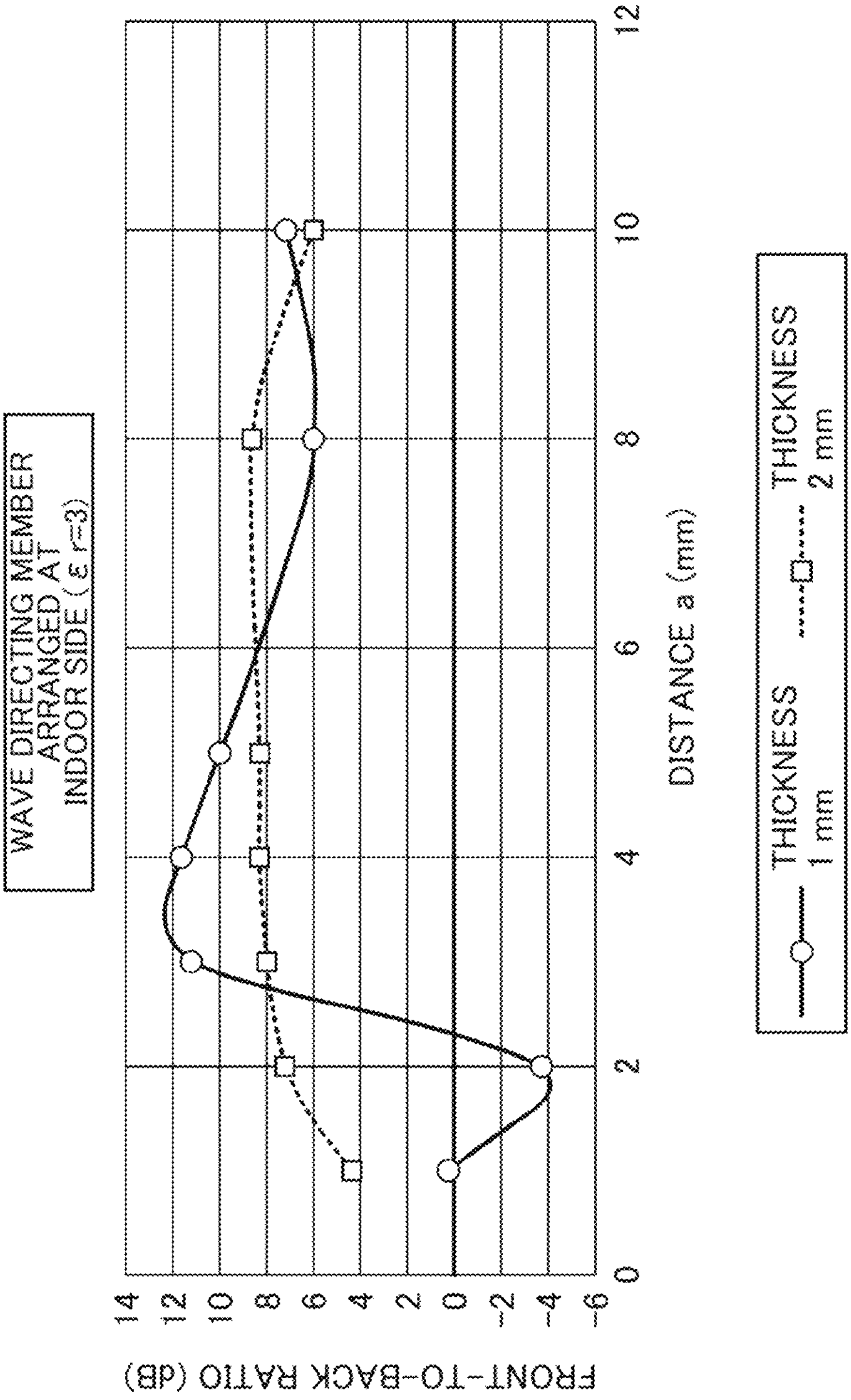
FIG. 17 is a figure (part 1) illustrating an example of relationship between an FB ratio and a distance a between a radiating element and a wave directing member in an antenna unit-attached window glass in which a wave directing member is provided on an indoor side of a dielectric member.
Figure 18:
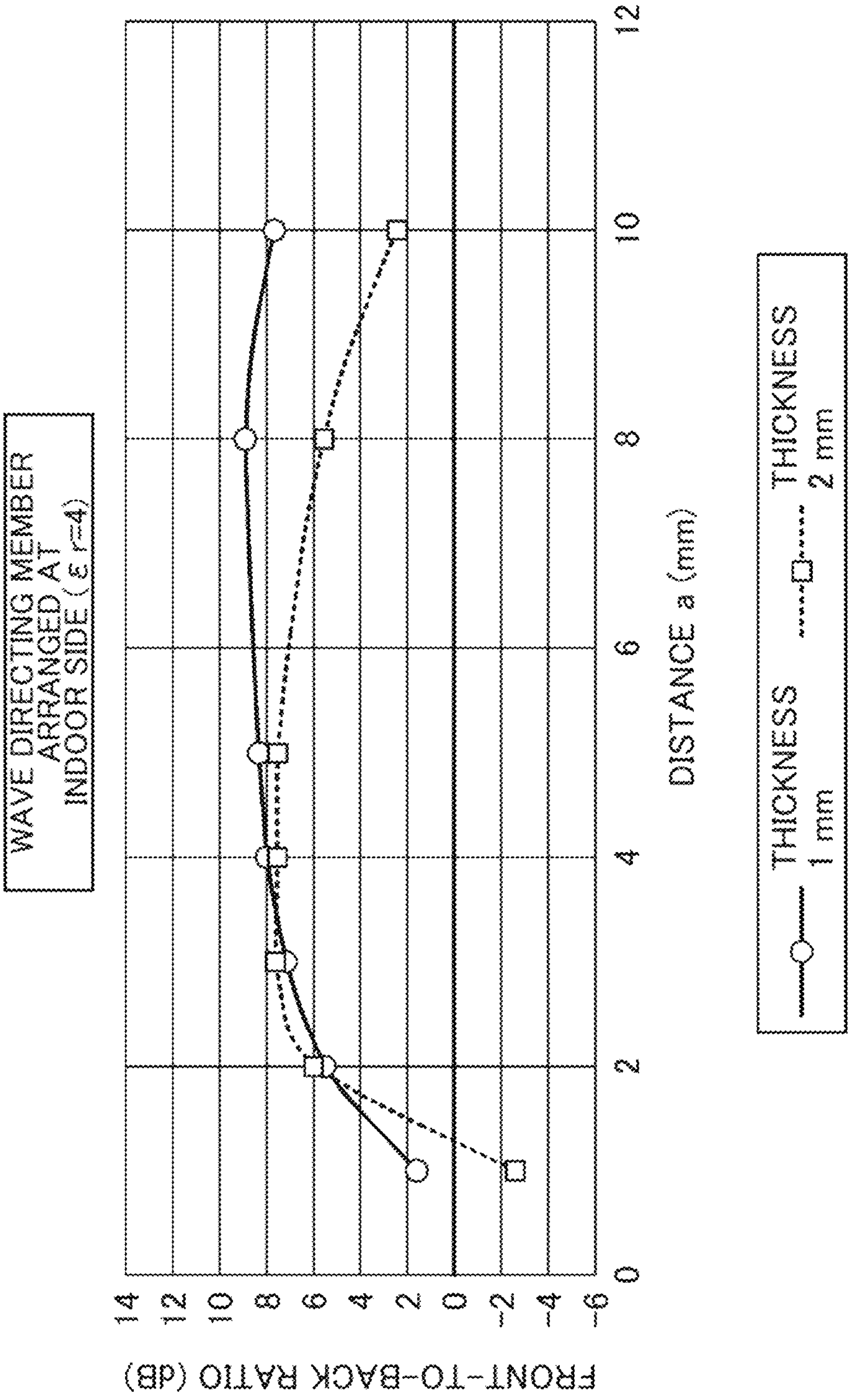
FIG. 18 is a figure (part 2) illustrating an example of relationship between the FB ratio and the distance a between the radiating element and the wave directing member in the antenna unit-attached window glass in which the wave directing member is provided on the indoor side of the dielectric member.

FIGS. 17, 18 are figures illustrating examples of relationships between the distance a, between the radiating element 10 and the wave directing member 20, and the FB ratio, when the thickness of the dielectric member 41 was changed, in the antenna unit-attached window glass 303 in which the wave directing member 20 was provided on the indoor side of the dielectric member 41. In the case of FIG. 17, the relative permittivity of the dielectric member 41 was 3. In the case of FIG. 18, the relative permittivity of the dielectric member 41 was 4. In a range in which the distance a was 3.0 mm or more and 4 mm or less, a thinner thickness resulted in a significantly higher FB ratio in FIG. 17 with the relative permittivity being 3 than in FIG. 16 with the relative permittivity being 4.

Figure 21:
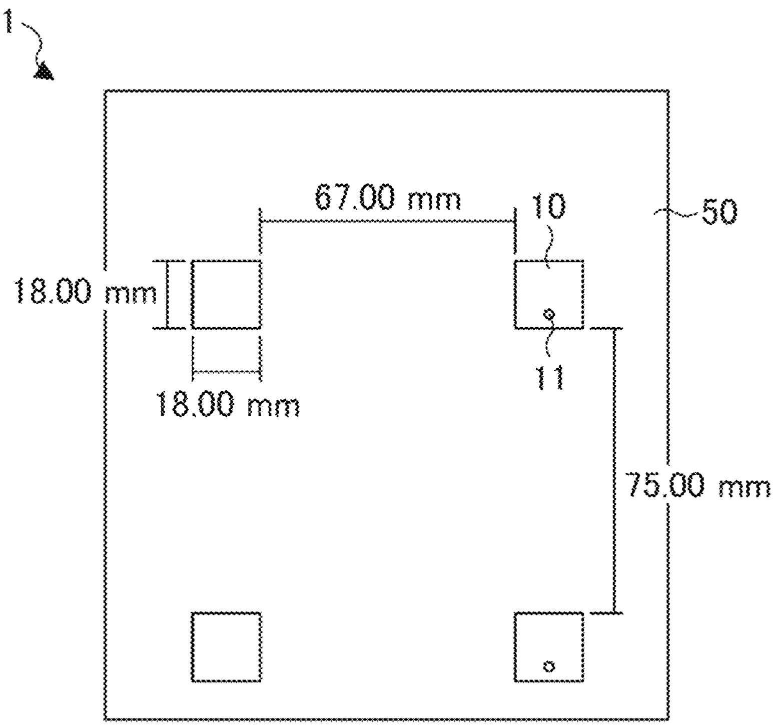
FIG. 21 is a plan view illustrating an example of configuration of multiple radiating elements included in an antenna unit according to the present embodiment.
Figure 22:
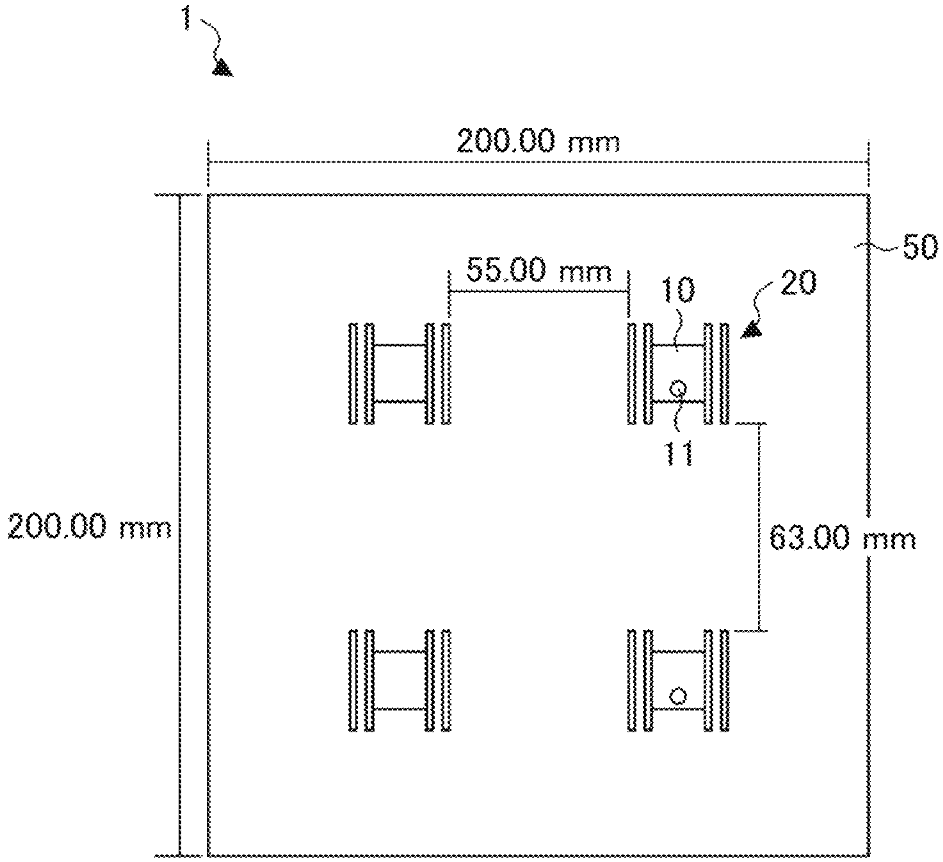
FIG. 22 is a plan view illustrating an example of configuration of wave directing members and a dielectric member included in an antenna unit according to the present embodiment.
Figure 23:
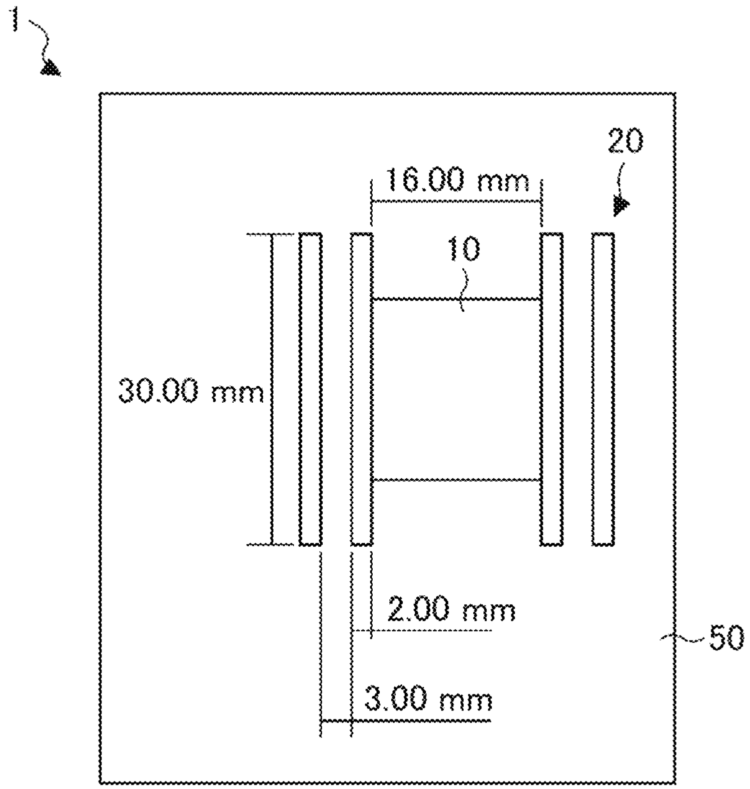
FIG. 23 is a plan view illustrating an example of configuration of a wave directing member included in an antenna unit according to the present embodiment.

FIGS. 21 to 23 are plan views partially illustrating an example of configuration of the antenna unit 1 according to the present embodiment. FIG. 21 is a plan view illustrating an example of configuration of multiple radiating elements 10 included in the antenna unit 1 according to the present embodiment. FIG. 22 is a plan view illustrating an example of configuration of the wave directing member 20 and the dielectric member 50 included in the antenna unit 1 according to the present embodiment. FIG. 23 is a plan view illustrating an example of configuration of the wave directing member 20 included in the antenna unit 1 according to the present embodiment.

The antenna unit 1 as illustrated in FIGS. 21 to 23 had a configuration in which the dielectric member 50 was sandwiched between the radiating element 10 and the conductor 30 so as to form a microstrip antenna. Also, the antenna unit 1 had four radiating elements 10 arranged on a surface of the dielectric member 50 on the side of the wave directing member 20 so as to form an array antenna. The radiating element 10 was fed at a feeding point 11. The wave directing member 20 included multiple (specifically, four) conductor elements in line segments arranged parallel to each other.

FIGS. 24 to 27 illustrate a relationship between the distances a and D yielding an FB ratio of 0 dB or more and capable of achieving an effect of the wave directing member 20 (i.e., attaining a higher antenna gain than cases without the wave directing member 20), in a simulation in which the antenna unit 1 was attached to the window glass 201 as illustrated in FIG. 2 (however, the dielectric member 41 was not provided). The distance a represents a distance between the radiating element 10 and the wave directing member 20. The distance D represents a distance between the radiating element 10 and the window glass 201.

While the distances a and D were changed, the antenna gain with the wave directing member 20 being attached and the antenna gain without the wave directing member 20 being attached were calculated, and upper and lower limit lines as illustrated in the graphs were obtained by plotting a pair of the distances a and D at which the antenna gain with the wave directing member 20 being attached was higher than the antenna gain without the wave directing member 20 being attached. A lower limit broken line and an upper limit broken line as illustrated in FIGS. 24 to 27 represent regression curves where the antenna gain with the wave directing member 20 being attached and the antenna gain without the wave directing member 20 being attached are substantially the same, when the distances a and e were normalized with 1 wavelength (=85.7 mm) of the operation frequency of the radiating element 10, i.e., 3.5 GHZ.

Figure 24:
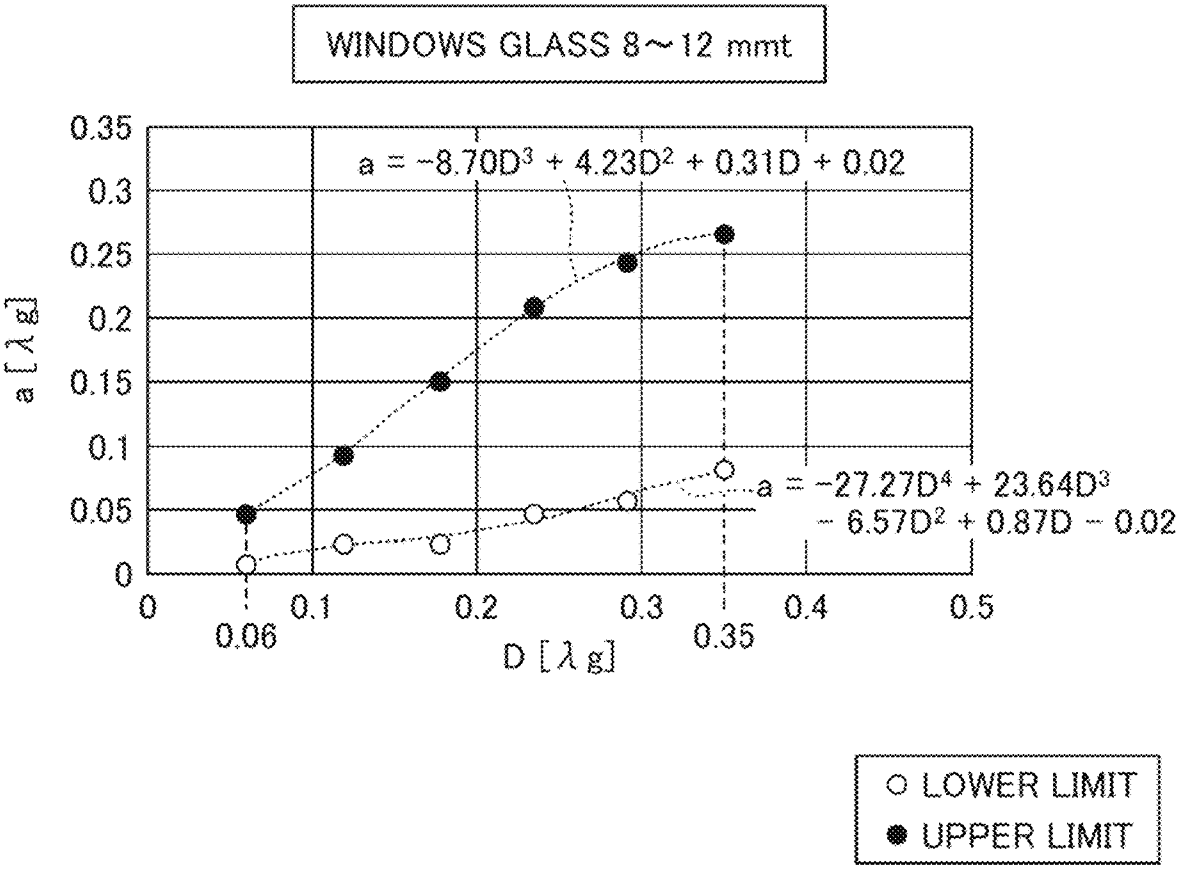
FIG. 24 illustrates a relationship between distances a and D capable of achieving an effect of a wave directing member.

In FIG. 24, the wavelength of the operation frequency of the radiating element 10 was denoted as $\lambda_g$, and the thickness of the window glass 201 was assumed to be 8 mm or more and 12 mm or less.

In this case, when the distance a was $(-27.27\times D^4+23.64\times D^3-6.57\times D^2+0.87\times D-0.02)\times\lambda_g$ or more and $(-8.70\times D^3+4.23\times D^2+0.31\times D+0.02)\times\lambda_g$ or less, and when the distance D was $0.06\times\lambda_g$ or more and $0.35\times\lambda_g$ or less, the antenna gain with the wave directing member 20 being attached was higher than the antenna gain without the wave directing member 20 being attached.

Figure 25:
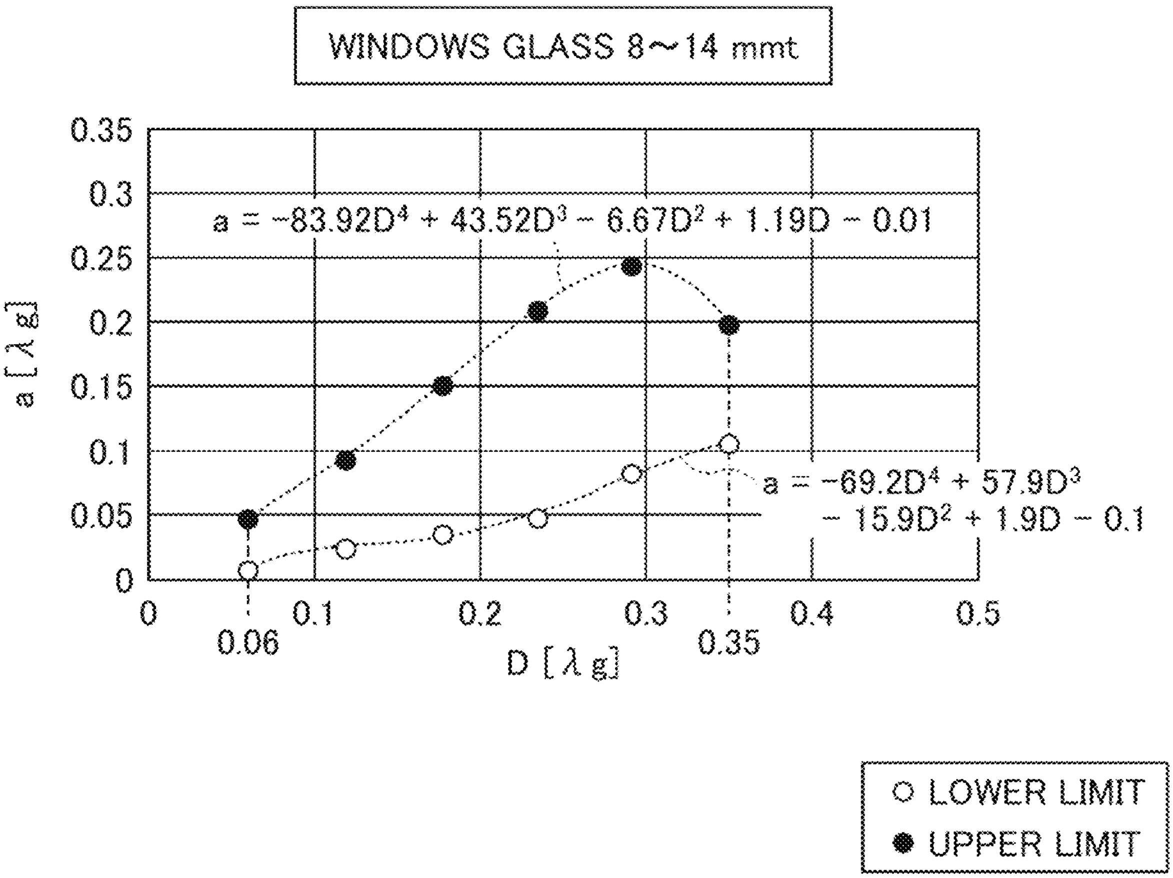
FIG. 25 illustrates a relationship between distances a and D capable of achieving an effect of a wave directing member.

In FIG. 25, the wavelength of the operation frequency of the radiating element 10 was denoted as $\lambda_g$, and the thickness of the window glass 201 was assumed to be 8 mm or more and 14 mm or less.

In this case, when the distance a was $(-69.2\times D^4+57.9\times D^3-15.9\times D^2+1.9\times D-0.1)\times\lambda_g$ or more and $(-83.92\times D^4+43.52\times D^3-6.67\times D^2+1.19\times D-0.01)\times\lambda_g$ or less, and when the distance D was $0.06\times\lambda_g$ or more and $0.35\times\lambda_g$ or less, the antenna gain with the wave directing member 20 being attached was higher than the antenna gain without the wave directing member 20 being attached.

Figure 26:
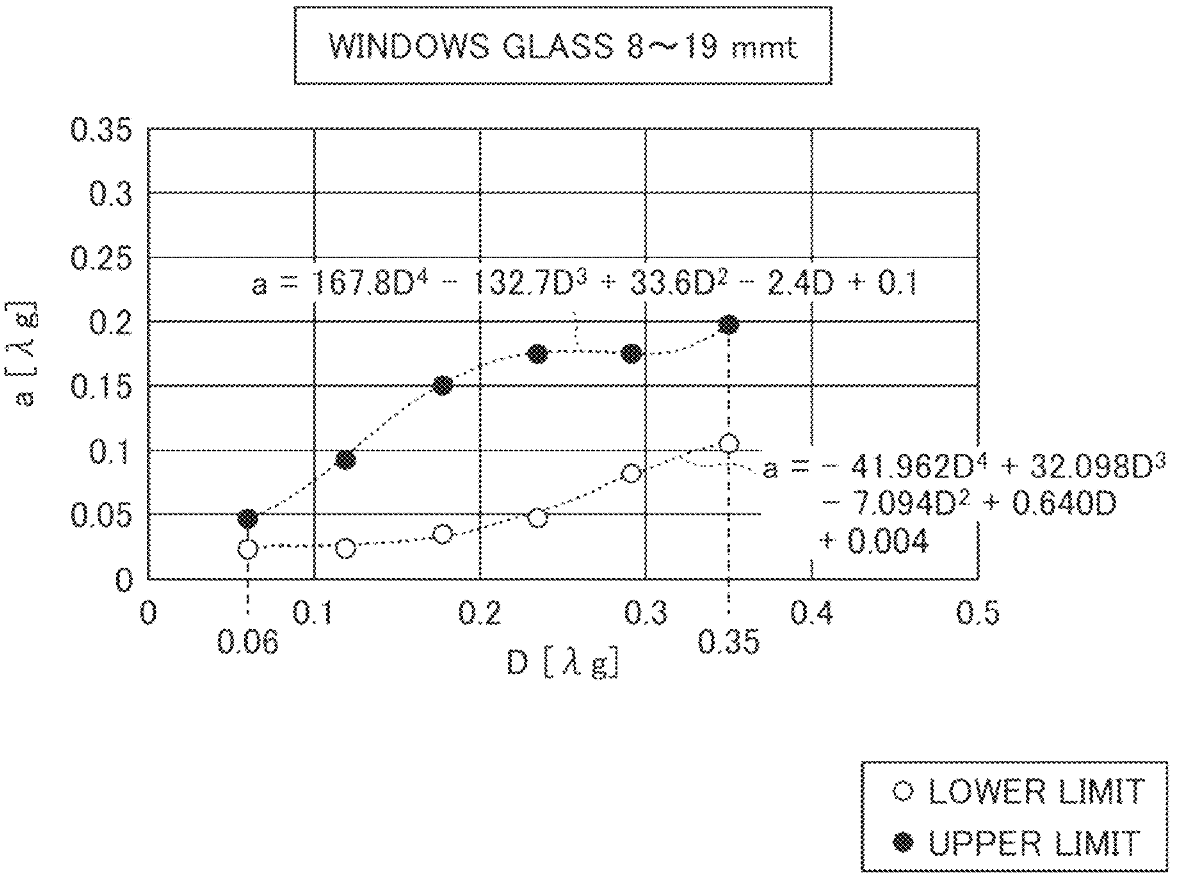
FIG. 26 illustrates a relationship between distances a and D capable of achieving an effect of a wave directing member.

In FIG. 26, the wavelength of the operation frequency of the radiating element 10 was denoted as $\lambda_g$, and the thickness of the window glass 201 was assumed to be 8 mm or more and 19 mm or less.

In this case, the distance a was $(-41.962\times D^4+32.098\times D^3-7.094\times D^2+0.640\times D+0.004)\times\lambda_g$ or more and $(167.8\times D^4-132.7\times D^3+33.6\times D^2-2.4\times D+0.1)\times\lambda_g$ or less, and when the distance D was $0.06\times\lambda_g$ or more and $0.35\times\lambda_g$ or less, the antenna gain with the wave directing member 20 being attached was higher than the antenna gain without the wave directing member 20 being attached.

Figure 27:
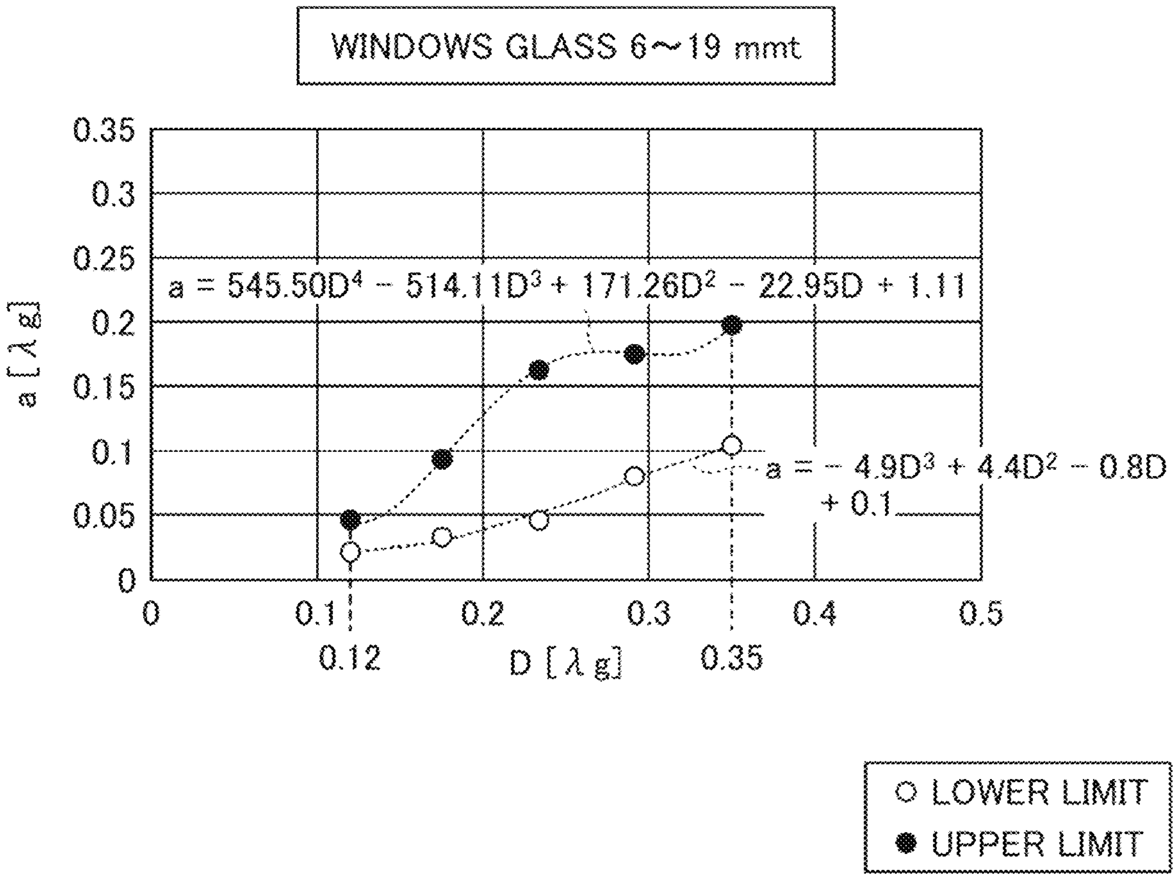
FIG. 27 illustrates a relationship between distances a and D capable of achieving an effect of a wave directing member.

In FIG. 27, the wavelength of the operation frequency of the radiating element 10 was denoted as $\lambda_g$, and the thickness of the window glass 201 was assumed to be 6 mm or more and 19 mm or less.

In this case, when the distance a was $(-4.9\times D^3+4.4\times D^2-0.8\times D+0.1)\times\lambda_g$ or more and $(545.50\times D^4-514.11\times D^3+171.26\times D^2-22.95\times D+1.11)\times\lambda_g$ or less, and when the distance D was $0.12\times\lambda_g$ or more and $0.35\times\lambda_g$ or less, the antenna gain with the wave directing member 20 being attached was higher than the antenna gain without the wave directing member 20 being attached.

FIGS. 28 to 31 illustrate relationships between distances a and D capable of achieving an antenna gain of 8 dBi or higher, in a simulation in which the antenna unit 1 was attached to the window glass 201 as illustrated in FIG. 2 (however, the dielectric member 41 was not provided). When the antenna gain was 8 dBi or more, preferable communication areas were formed.

While the distances a and D were changed, upper and lower limit lines as illustrated in the graphs were obtained by plotting a pair of the distances a and D at which an antenna gain of 8 dBi or more can be obtained. A lower limit broken line and an upper limit broken line as illustrated in FIGS. 28 to 31 represent regression curves where antenna gain was 8 dBi, when the distances a and D were normalized with 1 wavelength (=85.7 mm) of the operation frequency of the radiating element 10, i.e., 3.5 GHZ.

Figure 28:
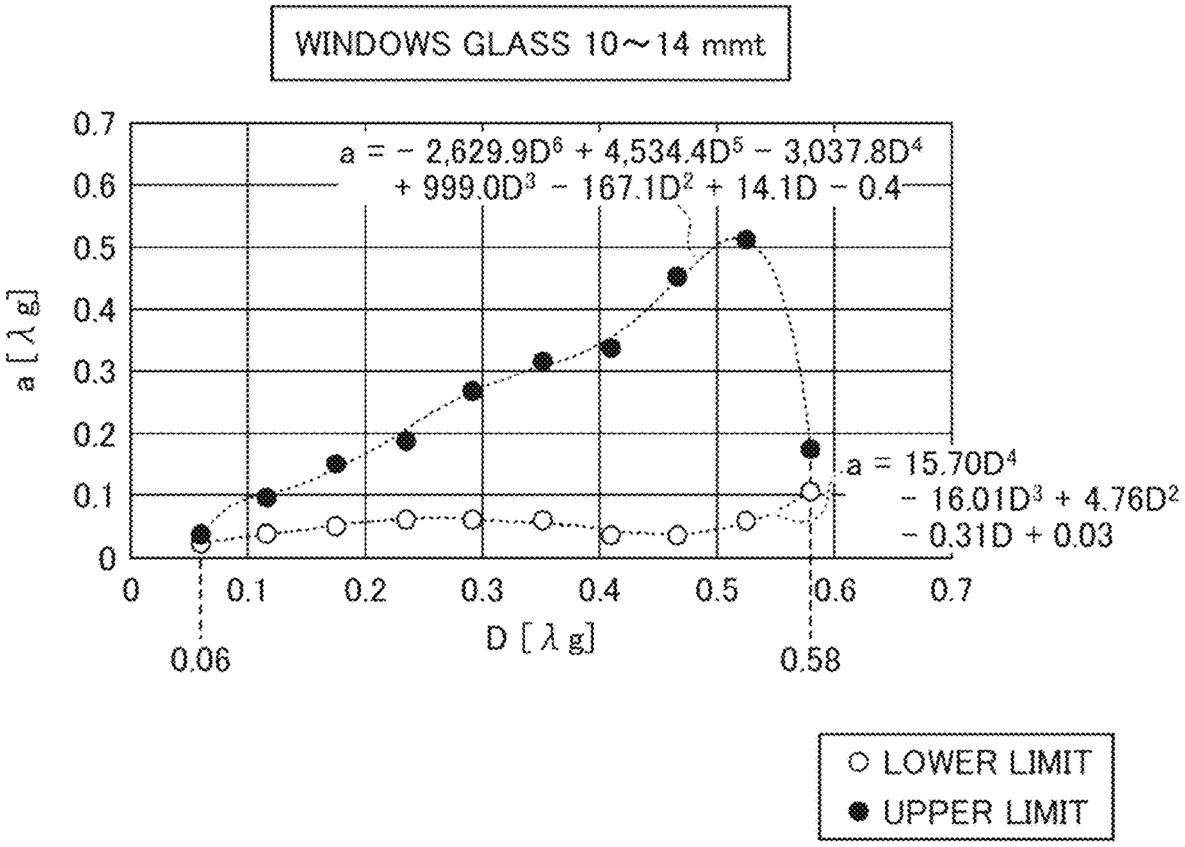
FIG. 28 illustrates a relationship between distances a and D capable of achieving an antenna gain of 8 dBi or higher.

In FIG. 28, the wavelength of the operation frequency of the radiating element 10 was denoted as $\lambda_g$, and the thickness of the window glass 201 was assumed to be 10 mm or more and 14 mm or less.

In this case, when the distance a was $(15.70\times D^4-16.01\times D^3+4.76\times D^2-0.31\times D+0.03)\times\lambda_g$ or more and $(-2629.9\times D^6+4534.4\times D^5-3037.8\times D^4+999.0\times D^3-167.1\times D^2+14.1\times D-0.4)\times\lambda_g$ or less, and when the distance D was $0.06\times\lambda_g$ or more and $0.58\times\lambda_g$ or less, an antenna gain of 8 dBi or more was obtained.

Figure 29:
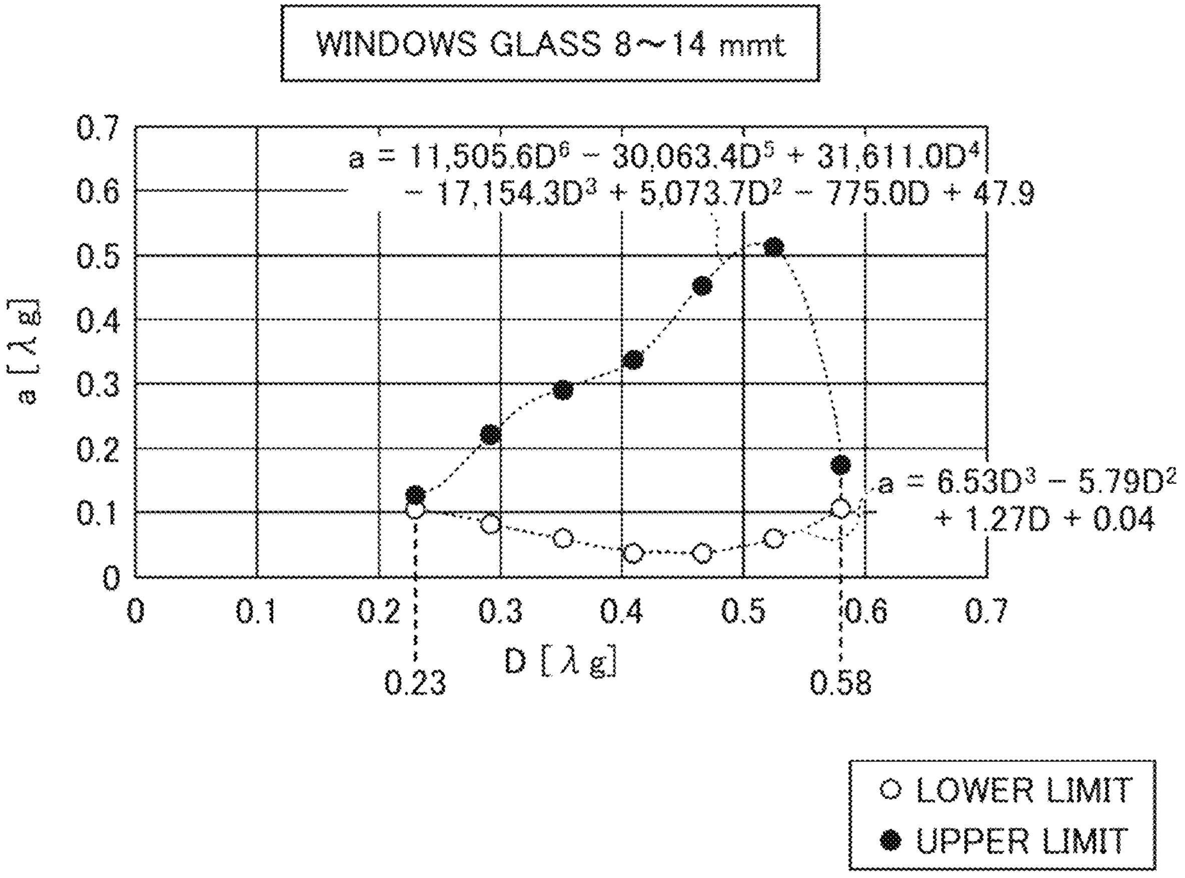
FIG. 29 illustrates a relationship between distances a and D capable of achieving an antenna gain of 8 dBi or higher.

In FIG. 29, the wavelength of the operation frequency of the radiating element 10 was denoted as $\lambda_g$, and the thickness of the window glass 201 was assumed to be 8 mm or more and 14 mm or less.

In this case, when the distance a was $(6.53\times D^3-5.79\times D^2+1.27\times D+0.04)\times\lambda_g$ or more and $(11505.6\times D^6-30063.4\times D^5+31611.0\times D^4-17154.3\times D^3+5073.7\times D^2-775.0\times D+47.9)\times\lambda_g$ or less, and when the distance D was $0.23\times\lambda_g$ or more and $0.58\times\lambda_g$ or less, an antenna gain of 8 dBi or more was obtained.

Figure 30:
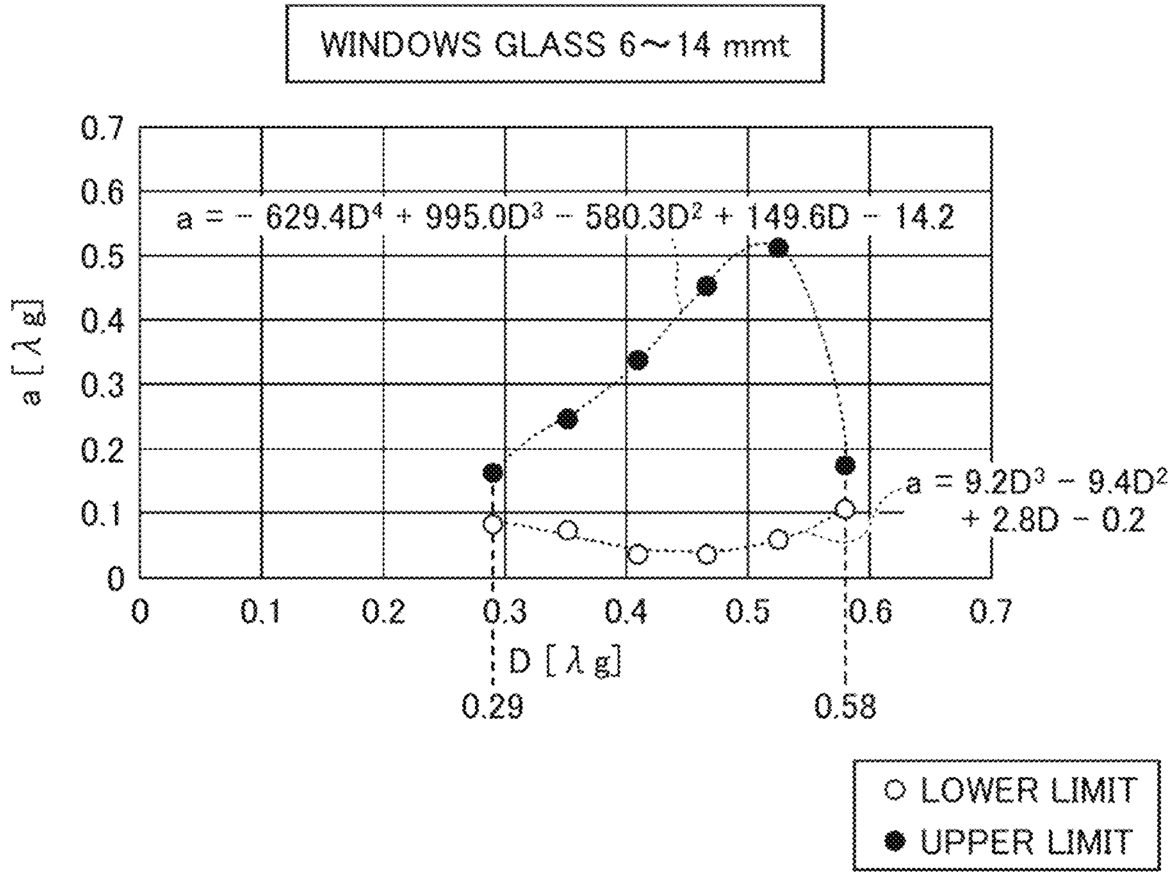
FIG. 30 illustrates a relationship between distances a and D capable of achieving an antenna gain of 8 dBi or higher.

In FIG. 30, the wavelength of the operation frequency of the radiating element 10 was denoted as $\lambda_g$, and the thickness of the window glass 201 was assumed to be 6 mm or more and 14 mm or less.

In this case, when the distance a was $(9.2\times D^3-9.4\times D^2+2.8\times D-0.2)\times\lambda_g$ or more and $(-629.4\times D^4+995.0\times D^3-580.3\times D^2+149.6\times D-14.2)\times\lambda_g$ or less, and when the distance D was $0.29\times\lambda_g$ or more and $0.58\times\lambda_g$ or less, an antenna gain of 8 dBi or more was obtained.

Figure 31:
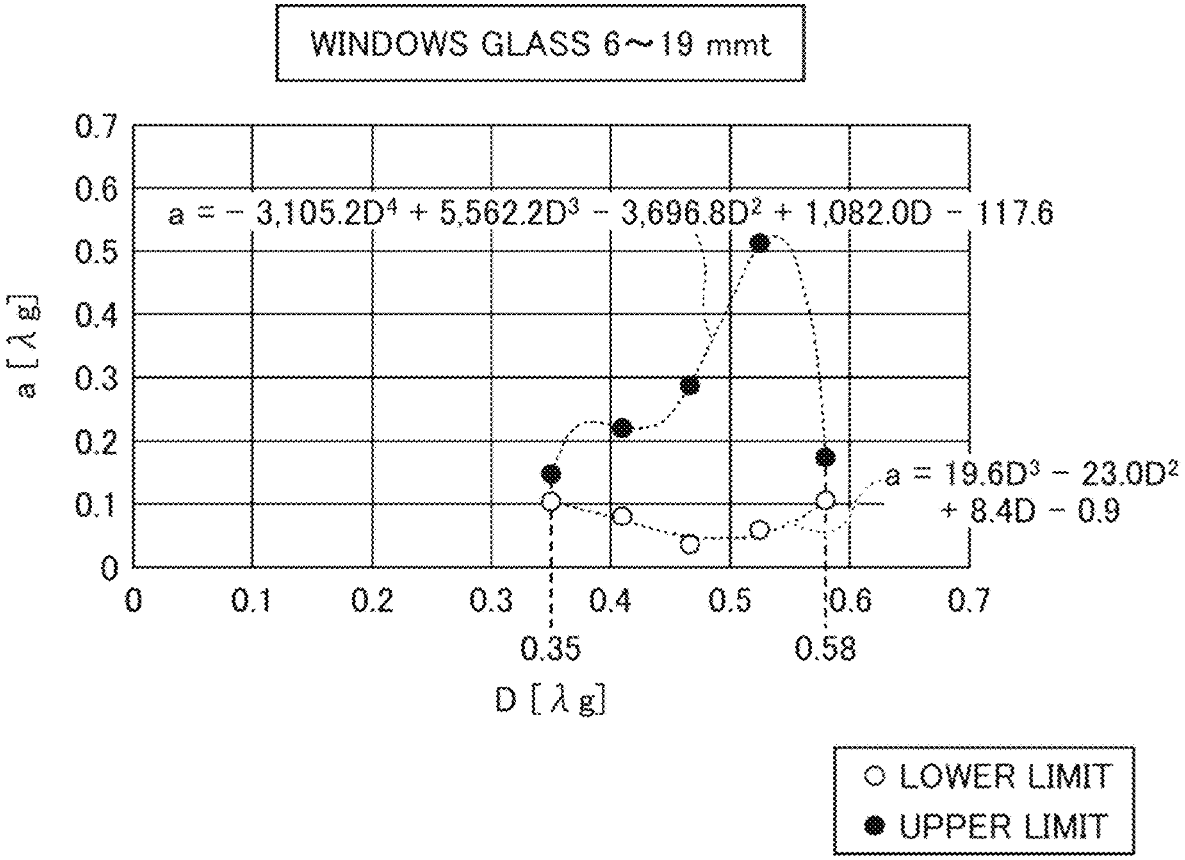
FIG. 31 illustrates a relationship between distances a and D capable of achieving an antenna gain of 8 dBi or higher.

In FIG. 31, the wavelength of the operation frequency of the radiating element 10 was denoted as $\lambda_g$, and the thickness of the window glass 201 was assumed to be 6 mm or more and 19 mm or less.

In this case, when the distance a was $(19.6\times D^3-23.0\times D^2+8.4\times D-0.9)\times\lambda_g$ or more and $(-3105.2\times D^4+5562.2\times D^3-3696.8\times D^2+1082.0\times D-117.6)\times\lambda_g$ or less, and when the distance D was $0.35\times\lambda_g$ or more and $0.58\times\lambda_g$ or less, an antenna gain of 8 dBi or more was obtained.

Hereinabove, an antenna unit, an antenna unit-attached window glass, and a matching body have been explained with reference to embodiments. However, the present invention is not limited to the above embodiments. Various modifications and improvements such as a combination, replacement, and the like with a part or the entirety of another embodiment can be made within the scope of the present invention.

Hereinafter, other aspects of the present disclosure are explained.

According to an aspect of the present disclosure, an antenna unit used by being attached to window glass for a building, includes:

a radiating element arranged so that a matching member is interposed between the window glass and the radiating element; and a conductor arranged so that the radiating element is interposed between the matching member and the conductor, wherein where a relative permittivity of the window glass is denoted as $\varepsilon_r1$, a relative permittivity of the matching member is denoted as $\varepsilon_r2$, and a relative permittivity of a medium between the matching member and the radiating element is denoted as $\varepsilon_r3$, $\varepsilon_r1$ is larger than $\varepsilon_r2$, and $\varepsilon_r2$ is larger than $\varepsilon_r3$.

In the above antenna unit, where a distance between the window glass and the radiating element is denoted as e, the distance e may be $(-0.57\times\varepsilon_r2+30.1)$ mm or more.

According to an aspect of the present disclosure, an antenna unit used by being attached to window glass for a building, includes:

a radiating element arranged so that a matching member is interposed between the window glass and the radiating element; and a conductor arranged so that the radiating element is interposed between the matching member and the conductor, wherein where a distance between the window glass and the radiating element is denoted as e, and a relative permittivity of the matching member is denoted as $\varepsilon_r2$, e is $(-0.57\times\varepsilon_r2+30.1)$ mm or more.

According to an aspect of the present disclosure, a matching body is used by being sandwiched between window glass for a building and an antenna unit, wherein where a relative permittivity of the window glass is denoted as $\varepsilon_r1$, a relative permittivity of the matching member is denoted as $\varepsilon_r2$, and a relative permittivity of a medium between the matching member and a radiating element provided in the antenna unit is denoted as $\varepsilon_r3$, $\varepsilon_r1$ is larger than $\varepsilon_r2$, and $\varepsilon_r2$ is larger than $\varepsilon_r3$.

According to an aspect of the present disclosure, a matching body is used by being sandwiched between window glass for a building and an antenna unit, wherein where a distance between the window glass and a radiating element provided in the antenna unit is denoted as e, and a relative permittivity of the matching member is denoted as $\varepsilon_r2$, e is $(-0.57\times \varepsilon_r2+30.1)$ mm or more.

According to an aspect of the present disclosure, a matching body is used by being sandwiched between window glass for a building and an antenna unit, wherein where a distance between the window glass and a radiating element provided in the antenna unit is denoted as e, and a relative permittivity of the matching member is denoted as $\varepsilon_r2$, and a wavelength at an operation frequency of the radiating element is denoted as $\lambda_g$, e is $(-0.002\times \varepsilon_r2^2+0.0849\times\varepsilon_r2+0.2767)\times\lambda_g$ or more.

What is claimed is:

1. An antenna unit for attaching to window glass of a building, comprising:

a radiating element positioned such that a matching member is interposed between window glass and the radiating element; and a conductor positioned such that the radiating element is interposed between the matching member and the conductor, wherein $\varepsilon_r1$ is larger than $\varepsilon_r2$, and $\varepsilon_r2$ is larger than $\varepsilon_r3$, where $\varepsilon_r1$ is a relative permittivity of the window glass, $\varepsilon_r2$ is a relative permittivity of the matching member, and $\varepsilon_r3$ is a relative permittivity of a medium between the matching member and the radiating element, and wherein e is $(-0.57\times\varepsilon_r2+30.1)$ mm or more, where e is a distance between the window glass and the radiating element.

2. The antenna unit according to claim 1, wherein d is $\lambda_g/4$ or less, where d is a distance between the radiating element and the conductor, and $\lambda_g$ is a wavelength at an operation frequency of the radiating element.

3. An antenna unit-attached window glass, comprising:

the antenna unit of claim 2; and the window glass.

4. An antenna unit-attached window glass, comprising:

the antenna unit of claim 1; and the window glass.

* * * * *